United States Patent [19]
Miyazaki et al.

[11] Patent Number: 5,977,725
[45] Date of Patent: Nov. 2, 1999

[54] RESONANCE TYPE POWER CONVERTER UNIT, LIGHTING APPARATUS FOR ILLUMINATION USING THE SAME AND METHOD FOR CONTROL OF THE CONVERTER UNIT AND LIGHTING APPARATUS

[75] Inventors: Hideki Miyazaki; Hiroyuki Shoji, both of Hitachi; Yuichi Namura, Ome, all of Japan

[73] Assignee: Hitachi, Ltd., Tokyo, Japan

[21] Appl. No.: 08/921,363

[22] Filed: Aug. 29, 1997

[30] Foreign Application Priority Data

Sep. 3, 1996 [JP] Japan .................................. 8-252499
Sep. 17, 1996 [JP] Japan .................................. 8-244440
Jun. 12, 1997 [JP] Japan .................................. 9-154745

[51] Int. Cl.$^6$ ........................................................ G05F 1/00
[52] U.S. Cl. ...................... 315/291; 315/209 R; 315/307; 315/244; 363/134
[58] Field of Search .................................... 315/224, 244, 315/219, 209 R, 291, 307, 308, 294, DIG. 7; 363/20, 21, 58, 77, 134

[56] References Cited

U.S. PATENT DOCUMENTS 4,316,243  2/1982  Archer ..................................... 363/132
4,686,428  8/1987  Kuhnel et al. ........................... 315/307
4,952,849  8/1990  Fellows et al. .......................... 315/307
5,559,394  9/1996  Wood ...................................... 315/224
5,614,810  3/1997  Nostwick et al. ....................... 323/207
5,671,128  9/1997  Nakamura et al. ....................... 363/16
5,739,645  4/1998  Xia et al. ................................ 315/307

FOREIGN PATENT DOCUMENTS 0 806 888 A1  11/1997  European Pat. Off. .
A-8-9655   1/1996  Japan .
A-8-37092  2/1996  Japan .
9-238474   9/1997  Japan .

Primary Examiner—Haissa Philogene
Attorney, Agent, or Firm—Antonelli, Terry, Stout & Kraus, LLP

[57] ABSTRACT

A resonance type power converter unit has, in an inverter circuit in which voltage driven type semiconductor devices each having the function not to prevent a backward current are connected in series, the respective voltage driven devices are associated with capacitors which are charged or discharged with currents flowing through the devices and voltage detectors for detecting voltages of the capacitors, and drive circuits for turning on and off the voltage driven devices in accordance with outputs of the voltage detectors. With the resonance type power converter unit, stable resonance operation synchronous with a high-frequency load current can be warranted.

20 Claims, 19 Drawing Sheets t1 TIME INTERVAL t2 TIME INTERVAL t3 TIME INTERVAL t4 TIME INTERVAL

LIGHTING
CONTROL
SIGNAL

ANOTHER EMBODIMENT OF RESONANCE TYPE POWER CONVERTER UNIT

OPERATIONAL EXPLANATION

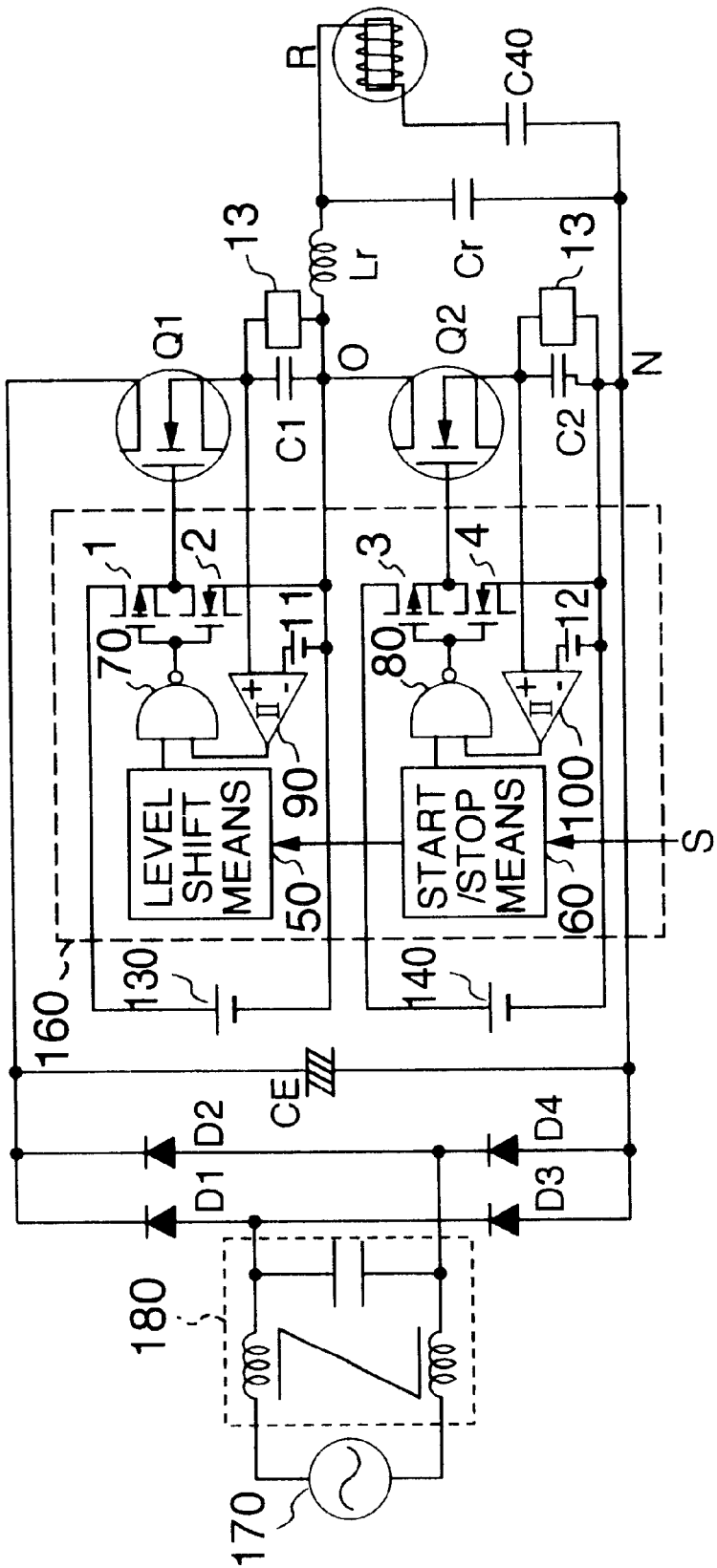
FIG.23 CONSTRUCTION OF ELECTRODELESS LAMP LIGHTING APPARATUS

CONSTRUCTION OF FLUORESCENT LAMP LIGHTING APPARATUS

CONSTRUCTION OF HIGHER HARMONICS SUPPRESSING HIGH-EFFICIENT CONVERTER

OPERATION MODE 1

OPERATION MODE 2

RESONANCE TYPE POWER CONVERTER UNIT, LIGHTING APPARATUS FOR ILLUMINATION USING THE SAME AND METHOD FOR CONTROL OF THE CONVERTER UNIT AND LIGHTING APPARATUS

BACKGROUND OF THE INVENTION

The present invention relates to resonance type power converter units and more particularly to a resonance type power converter unit employable in a lighting apparatus for illumination using a high resonance frequency or a resonance type active filter for suppression of higher harmonics.

In recent years, a discharge tube (for example, fluorescent lamp) of the type in which a DC voltage is converted into a high-frequency AC voltage by means of a lighting circuit using an inverter and the high-frequency AC voltage is applied to a resonance load circuit inclusive of the discharge tube has been used widely. The resonance load circuit includes a resonance inductor and a resonance capacitor which are used for setting a resonance frequency. This type of lighting circuit is an inverter circuit having two power semiconductor switching devices which are connected to form a half bridge configuration between positive and negative polarities of a DC power source, and it applies the high-frequency AC voltage across the resonance load circuit. Current flowing through the resonance means can be controlled by changing the operating frequency of the inverter. On the assumption that the switching frequency for alternately turning on and off the two power semiconductor devices is f and the resonance frequency determined by the resonance inductor and capacitor is fo, lamp current changes to make luminescence of the discharge tube unstable unless f is constant for fo.

As a first conventional example for stabilization of the driving frequency of the switching devices, a drive unit as disclosed in JP-A-8-37092 is known. The conventional drive unit features in that it has 1) a timer circuit for generation of a square wave of a desired frequency, 2) high-side and low-side drive circuits adapted to drive two power semiconductor switching devices of an inverter in accordance with a drive signal from the timer circuit, 3) high-side and low-side dead time delay circuits adapted to prevent simultaneous conduction of the two power semiconductor switching devices and 4) a level shift circuit adapted to convert a signal based on a reference of low-side common potential into a signal based on a reference of high-side common potential in order for the drive signal from the timer circuit to be transmitted to the high side, and that these circuits are built in a single integrated circuit. It will be appreciated that in the above conventional example, the switching devices are driven in accordance with the frequency of the timer circuit and essentially, this frequency is asynchronous with a resonance current of the lamp. As a second conventional example for performing switching synchronous with a resonance current flowing through the lamp, a control circuit disclosed in JP-A-8-9655 is known. In the control circuit, a terminal voltage across a circulating diode (having the function not to prevent backward current) provided for a power semiconductor switching device is detected to turn on the power semiconductor switching device, current of the power semiconductor switching device is integrated by means of an integrator, and the device is turned off when the integrated value exceeds a reference value.

In the aforementioned first conventional example, elements in each of the timer circuit, level shift circuit and dead time delay circuit have irregularities in characteristics or suffer from a temperature rise and expectantly, the oscillation frequency will shift and the operation will delay. Especially, in an electrodeless lamp reported recently, luminescence of a discharge tube is controlled by a method in which the frequency is raised to a value of several of MHz so that a high-frequency magnetic field may be generated by a high-frequency AC current and plasma in the lamp tube is sustained by the magnetic field. In such a resonance type inverter of several of MHz as above, a shift of oscillation frequency and a delay in operation cannot be negligible. More particularly, on the assumption that the delay time is 0.1 $\mu$s, the operation delay is only 0.5% of one wavelength in a stabilizer using an ordinary driving frequency of 50 kHz but amounts up to 20% of one wavelength in an electrodeless lamp of 2 MHz. Thus, when the high-frequency resonance type inverter of several of MHz is controlled by the conventional method, there arises a problem that the irregularity in driving frequency due to the operation delay becomes considerably large.

In the case of the lighting apparatus, the switching frequency f of the inverter is related to the resonance frequency fo determined by the resonance inductor and resonance capacitor as shown in FIG. 2 and in relation to an operational boundary at a resonance point (f=fo), a lagging phase is defined for f>fo and a leading phase is defined for f<fo. Current IL of the resonance circuit has a smaller value for either the lagging phase or the leading phase than that at the resonance point. Accordingly, the inverter is desired to be operated near the resonance point but in the case of the leading phase, there arises a problem that a through-current flows in the inverter.

When the inverter has power semiconductor switching devices Q1 and Q2 which incorporate circulating diodes QD1 and QD2, respectively, and an output voltage Vo is taken out of a connecting node of the devices Q1 and Q2, the leading phase is defined as a state in which a waveform of the resonance current IL leads a waveform of the output voltage Vo by a phase $\phi$. In the case of the leading phase, one-cycle operation proceeds in such a manner that during on-duration of the device Q1, the resonance current IL is switched from positive to negative and the current flows through the circulating diode QD1. Subsequently, the control circuit turns off the switching device Q1 and conversely turns on the device Q2, a backward voltage is abruptly applied to the diode QD1 through which the forward current has passed till then. As a result, electrons and positive holes stored in the diode QD1 (hereinafter referred to as residual carriers) are exhausted and a backward current (hereinafter referred to as a backward recovery current) from cathode to anode flows through the diode QD1. This current passes through the device Q2, behaving as a through-current for the inverter. The time required for the residual carriers to be exhausted is described as backward recovery time of diode in specifications of the device and even for a device of short backward recovery time called a high-speed diode, the backward recovery time is 0.05 to 0.1 $\mu$s. When the resonance type inverter of several of MHz is operated near the resonance point, the possibility that the leading phase due to the irregularity in switching frequency occurs is high and besides a high frequency prevails. For these reasons, a loss due to the through-current behaves as a factor which determines a thermal, operational limit of the lighting apparatus.

In the second conventional example, the power switching device is driven by detecting a voltage of a diode connected in parallel with the switching device and therefore, operation at the lagging phase is warranted. As described hereinafter, a larger current is required upon start of the discharge tube than during lighting and as the resonance current flowing through the discharge tube increases, the time required for the aforementioned integral value to reach the reference value decreases, so that the driving frequency of the switching device increases. On the other hand, in the case of lagging phase, the resonance current has such a characteristic that as the driving frequency of the switching device increases, the resonance current decreases as shown in FIG. 2. This leads to a problem that a large current cannot be obtained upon start.

SUMMARY OF THE INVENTION

An object of the present invention is to warrant a stable operation synchronous with the resonance current in a resonance type power converter unit applicable to a lighting apparatus of discharge tube which takes even an operating frequency of several of MHz into consideration.

According to the present invention, in a resonance type power converter unit for supplying an AC voltage to resonance means in accordance with switching of power semiconductor devices each having the function not to prevent a backward current, there are provided integrating means for integrating forward and backward currents flowing through the power semiconductor device to provide integral values, discharge means for decreasing the integral values in accordance with an off-duration of the power switching devices to provide decreased integral values, and drive means for turning on and off the power semiconductor devices in accordance with the thus decreased integral values.

In the present invention, the integrating means permit the power semiconductor devices to be turned on and off synchronously with the resonance current and therefore, a stable operation of the inverter can be warranted.

By applying the present invention to lighting apparatus for an electrodeless lamp and a fluorescent lamp, the lighting control function can newly be added, short-circuit current in the event of arm short-circuit can be decreased automatically, and the operation of the resonance type power converter unit can be stopped to fulfil the protective function for avoidance of abnormality at the end of lamp life, thereby achieving protection of the unit.

Further, by applying the present invention to a higher harmonics suppressing high-efficiency converter, higher harmonics of a current inputted from an AC power source can be suppressed and protection in the event of arm short-circuit can be achieved.

BRIEF DESCRIPTION OF THE DRAWINGS

FIG. 23 is a circuit diagram showing the construction of an electrodeless lamp lighting apparatus using the present invention.

DESCRIPTION OF THE PREFERRED EMBODIMENTS

Figure 1:
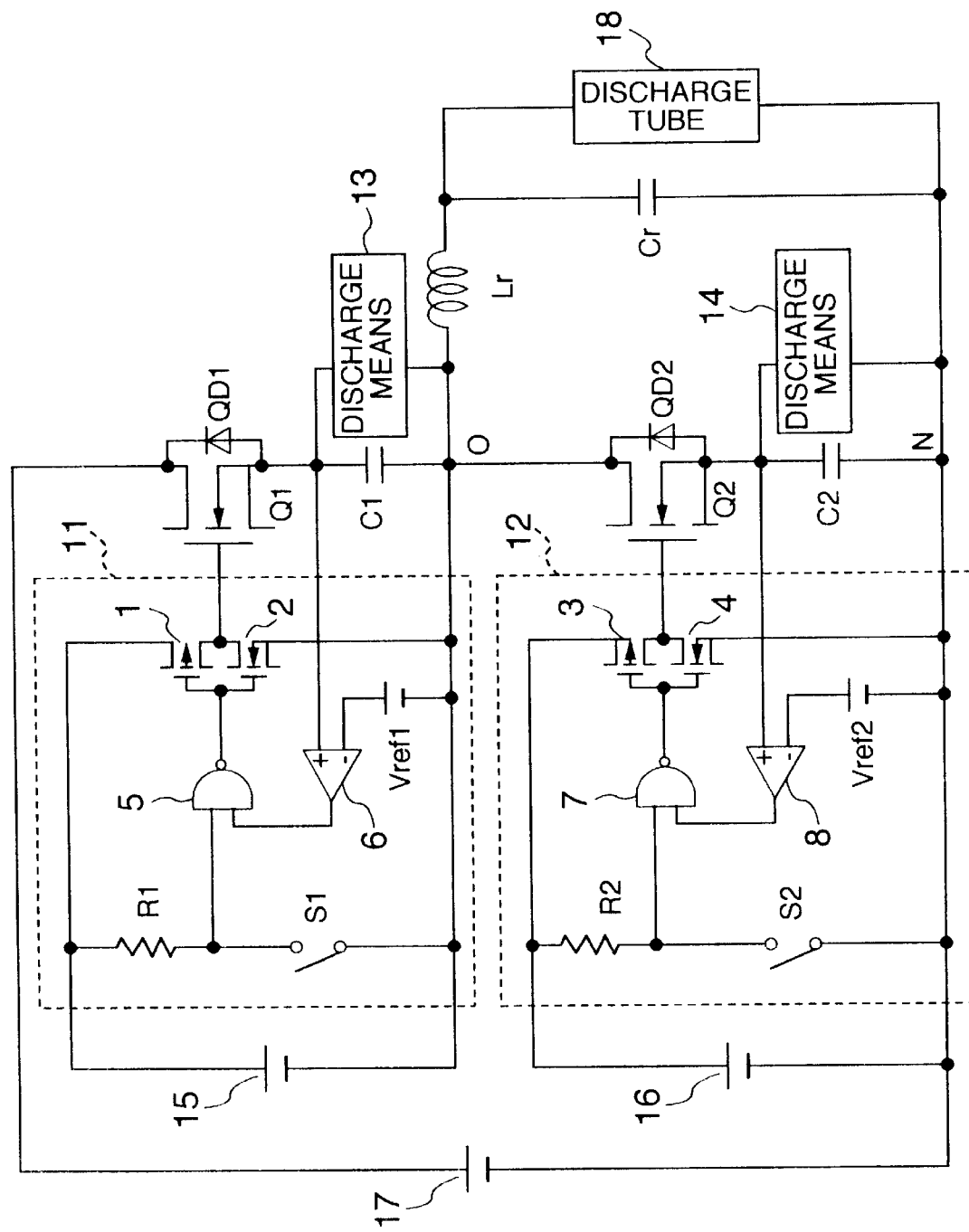
FIG. 1 is a circuit diagram showing the construction of an embodiment of a lighting apparatus for illumination according to the present invention.

Preferred embodiments of the present invention will now be described with reference to the accompanying drawings. FIG. 1 is a circuit diagram showing a first embodiment of the present invention. Referring to FIG. 1, power MOSFET's Q1 and Q2 connected in half bridge configuration have each a drain terminal for input of current, a source terminal for output of current and a gate terminal to or from which a control voltage is applied or removed. By applying or removing the control voltage to or from the gate terminal, conduction or interruption of a current flowing between the drain and the source can be effected. The MOSFET's incorporate diodes directed from the source terminal to the drain terminal and the diodes associated with the MOS- FET's Q1 and Q2 are hereinafter designated by QD1 and QD2, respectively.

The drain terminal of the MOSFET Q1 is connected to a positive polarity of a main power source 17, a capacitor C1 is connected between the source terminal of the MOSFET Q1 and the drain terminal of the MOSFET Q2, and a connecting node of the capacitors C1 and the MOSFET Q2 is used as an output terminal O of an inverter. A discharge means 13 is connected in parallel with the capacitor C1. Specifically, the discharge means is constructed of a resistor or a MOSFET whose internal resistance changes with a control signal, as will be described later. A capacitor C2 is connected between the source terminal of the MOSFET Q2 and a negative polarity of the power source 17 and a connecting node of the capacitor C2 and the power source 17 is designated by N. Like the capacitor C1, the capacitor C2 is also connected in parallel with a discharge means 14. A resonance inductor Lr and a resonance capacitor Cr are connected in series between the output O and the connecting node N, and a discharge tube (or a fluorescent lamp) 18 serving as a load is connected in parallel with the capacitor Cr. The construction of a resonance circuit having the inductor Lr, capacitor Cr and discharge tube 18 is not limited to that shown in FIG. 1 but for example, the discharge tube 18 may be connected in parallel with the inductor Lr. If each of the capacitors C1 and C2 has a capacitance which is several of tens times or more larger than that of the resonance capacitor Cr, a resultant capacitance of the capacitors C1, C2 and Cr nearly equals the capacitance of the capacitor Cr and the capacitors C1 and C2 hardly affect the resonance current.

Next, a high-side drive circuit 11 will be described. The drive circuit 11 is in association with a power source 15 based on a reference of output terminal O. A CMOS inverter comprised of devices 1 and 2 is connected between positive and negative polarities of the power source 15, having its output connected to the gate of the MOSFET Q1. The CMOS inverter passes a current for application of a voltage to the gate terminal of the MOSFET Q1 when the device 1 is turned on (at that time, the device 2 is turned off) but passes a current for discharge of electric charge stored in the gate terminal of the MOSFET Q1 when the device 2 is turned on (at that time, the device 1 is turned off). A control terminal of the CMOS inverter comprised of the devices 1 and 2 is applied with a signal from a NAND circuit 5. A voltage of the capacitor C1 is compared with a reference voltage Vref1 based on the reference of output terminal O by means of a comparator 6 and an output of the comparator 6 is inputted to the NAND circuit 5. The comparator 6 is fed from the positive polarity of the power source 15. A start/stop means comprised of a series connection of resistor R1 and switch S1 is connected across the power source 15 and a connecting node of the resistor R1 and the switch S1 is connected to the input of the NAND circuit 5. In FIG. 1, start is effected by turning off the switch S1 and stop is effected by turning on the switch S1.

Next, a low-side drive circuit 12 will be described. The drive circuit 12 is constructed similarly to the high-side drive circuit 11. A power source 16 based on the reference of terminal N is in association with the drive circuit 12, a CMOS inverter comprised of devices 3 and 4 is connected between positive and negative polarities of the power source 16 and an output of the CMOS converter is connected to a gate of the MOSFET Q2. A control terminal of the CMOS inverter comprised of the devices 3 and 4 is applied with a signal from a NAND circuit 7. A voltage of the capacitor C2 is compared with a reference voltage Vref2 based on the reference at point N by means of a comparator 8 and an output of the comparator 8 is inputted to the NAND circuit 7. Preferably, the high-side reference voltage Vref1 and the low-side reference voltage Vref2 have the same voltage value. A start/stop means comprised of a series connection of resistor R2 and switch S2 is connected across the power source 16 and a connecting node of the resistor R2 and the switch S2 is connected to the input of the NAND circuit 7. Like the switch S1, the switch S2 is turned off to effect start and is turned on to effect stop.

Figure 3:
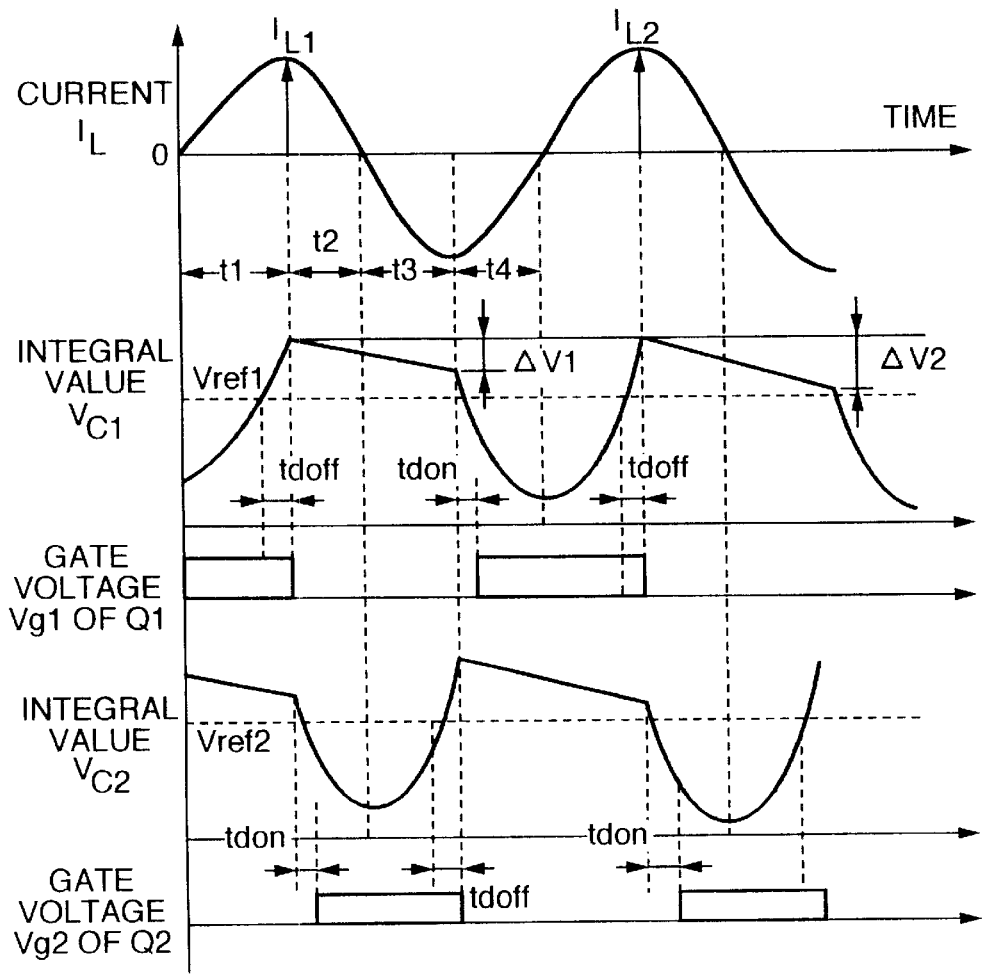
FIG. 3 is a time chart showing operation waveforms in the apparatus of FIG. 1.
Figure 4A:
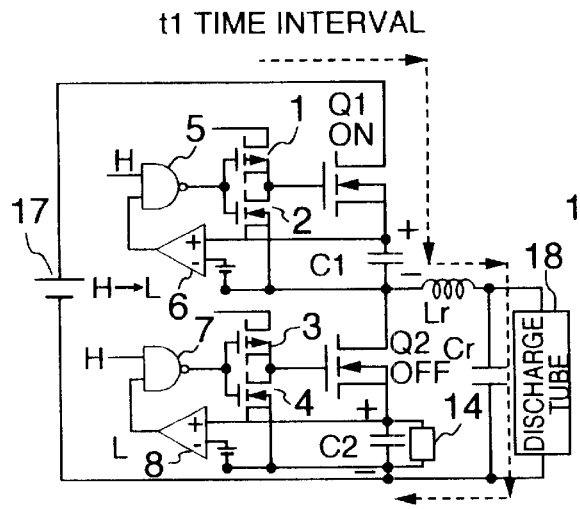
FIGS. 4A, 4B, 4C, 4D illustrate operational modes in the apparatus of FIG. 1.
Figure 4B:
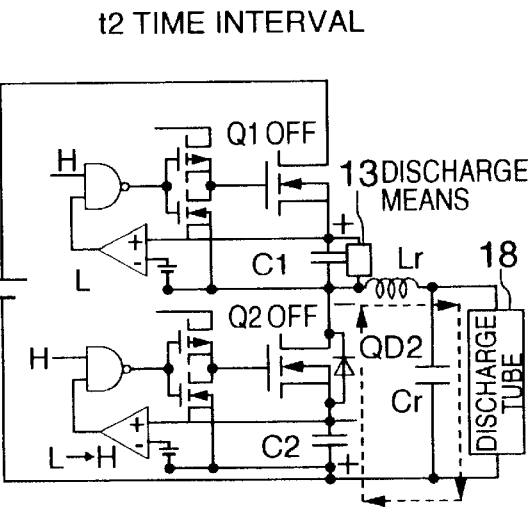
Figure 4C:
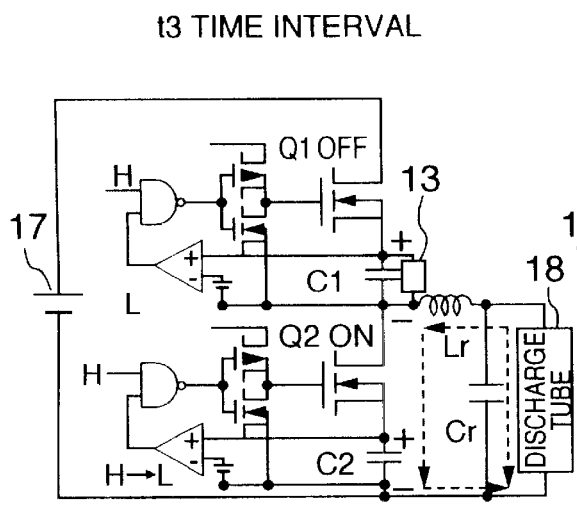
Figure 4D:
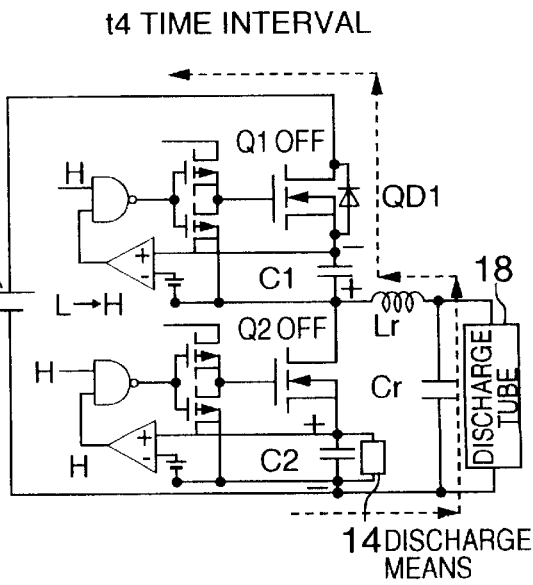

Next, the operation of the lighting apparatus for illumination will be described with reference to FIGS. 3 and 4. FIG. 3 shows waveforms at essential parts in the FIG. 1 embodiment. The discharge tube 18 is supplied with a high-frequency current from the current resonance circuit using the MOSFET's Q1 and Q2, inductor Lr and capacitor Cr. When the direction of resonance circuit current IL flowing out of the point O in FIG. 1 is defined as positive, there are four operational modes associated with the MOSFET's Q1 and Q2 and diodes QD1 and QD2 during one period of the current IL and these modes take place during time intervals t1 to t4 in FIG. 3. The operation of the lighting apparatus in the respective operational modes is shown at (a) to (d) in FIG. 4. The respective operational modes will now be described with reference to FIGS. 3 and 4.

Mode 1 (t1 time terminal)

When the MOSFET Q1 is turned on as shown at (a) in FIG. 4, a voltage of the main power source 17 is applied across points O and N and current IL flows through a path of Q1, C1, Lr and Cr. The current IL charges the capacitor Cr and partly branches to the discharge tube 18. Also, the capacitor C1 is charged with the current IL to produce a voltage Vc1 on the capacitor C1. The voltage Vc1 is compared with the reference voltage Vref1 by means of the comparator 6. As Vc1 reaches Vref1, the output of the comparator 6 changes from high to low. This output is received by the NAND circuit 5, so that the device 2 of the CMOS inverter is turned on to discharge the gate voltage of Q1 and the MOSFET Q1 is turned off. In FIG. 3, a delay time required for the MOSFET Q1 to be turned off by the action of device 2 after Vc1 reaches Vref1 is represented by tdoff.

As shown in FIG. 3, the current IL takes a sine waveform which is determined by the inductor Lr and capacitor Cr but the present scheme in which the MOSFET Q1 is turned off by detecting a charge voltage of Vc1 features in that the MOSFET Q1 is turned off during charge of Vc1, that is, during a time interval in which the polarity of the current IL is positive.

The operation till then is covered by mode 1 and the capacitor C2 is discharged during mode 1 by means of the discharge means 14. Voltage on C2, hereinafter designated by Vc2, gradually decreases during mode 1 as shown in FIG. 3.

Mode 2 (t2 time intervals)

At the time that the MOSFET Q1 is turned off, the current IL has a positive polarity value and keeps flowing through a path of Lr, Cr, C2 and QD2 as shown at (b) in FIG. 4. Part of the current IL branches to the discharge tube 18.

The current IL functions to counter-charge the capacitor C2 and voltage Vc2 is more decreased at that time than at the termination of the mode 1. As the voltage Vc2 falls below the value of Vref2, the output of the comparator 8 changes from low to high and this output is received by the NAND circuit 7, so that the device 3 of the CMOS inverter is turned on to charge the gate voltage of MOSFET Q2. In FIG. 3, a delay time required for the MOSFET Q1 to be turned on by the device 3 after Vc2 reaches Vref2 is represented by tdon. During mode 2, the current acts on the MOSFET Q2 in the backward direction and as shown in FIG. 3, even with the gate voltage charged, the current keeps flowing through the diode QD2 unless the polarity of the current changes. The mode 2 continues until the polarity of the current IL changes to negative and during this time interval, counter-charge of capacitor C2 continues and voltage Vc2 decreases.

During the mode 2, the capacitor C1 is discharged by the discharge means 13 and voltage Vc1 gradually decreases.
Mode 3 (t3 time interval)

When the polarity of the current IL changes from positive to negative, the current IL flows to the MOSFET Q2 whose gate voltage has been charged during the mode 2. More particularly, as shown at (c) in FIG. 4, the current IL serving as a discharge current of the capacitor Cr flows through a path of Q2, C2, Cr and Lr and the capacitor C2 is charged with the current IL. Voltage Vc2 is compared with Vref2 by means of the comparator 8. As the voltage Vc2 is increased by the current IL to reach the reference voltage Vref2, the output of the comparator 8 changes from high to low and this output is received by the NAND circuit 7, so that the device 4 of the CMOS inverter is turned on to discharge the gate voltage of Q2 and the MOSFET Q2 is turned off at the termination of a delay time of tdoff. As in the mode 1, the Q2 MOSFET is turned off, even in the mode 3, during a time interval in which the polarity of the current IL is negative.

During the mode 3, the operation as above proceeds and the capacitor C1 is discharged by means of the discharge means 13 and voltage Vc1 gradually decreases.
Mode 4 (t4 time interval)

The polarity of the current IL is negative at the time that the MOSFET Q2 is turned off and by the action of electromagnetic energy stored in the inductor Lr, the current IL keeps flowing through a path of Lr, C1, QD1, main power source 17, Cr and Lr as shown at (d) in FIG. 4. Part of the current IL branches to the discharge tube 18.

The current IL functions to counter-charge the capacitor C1 and the voltage Vc1 is more decreased at that time than at the termination of the mode 3. As the voltage Vc1 falls below the value of Vref1, the output of the comparator 6 changes from low to high and this output is received by the NAND circuit 5, so that the device 1 of the CMOS inverter is turned on to charge the gate voltage of Q1 following a delay time of tdon. During mode 4, the current acts on the MOSFET Q1 in the backward direction and even with the gate voltage charged, the current keeps flowing through the diode QD1 unless the polarity of the current changes. The mode 4 continues until the polarity of the current IL changes to positive and during this time interval, counter-charge of the capacitor C2 continues and voltage Vc1 decreases. During the mode 4, the capacitor C2 is discharged by the discharge means 14 and voltage Vc2 gradually decreases.

During one period of the current IL, the operational modes 1 to 4 proceed and thereafter, these operational modes are repeated.

According to the operation of the present embodiment,
1) Switching operation of the MOSFET's Q1 and Q2 is completed before the polarity of the current IL changes and the lagging phase operation can be warranted. In other words, in the mode 4 preceding turn-on of the MOSFET Q1, a current flows through the diode QD1 and a backward voltage has already been applied to the low-side diode QD2, thereby ensuring that the problem of the flow of backward recovery current of QD2 encountered in the leading phase can be prevented.
2) The delay time tdon does not affect the operation. More particularly, in the case of MOSFET Q1, even when the application of the gate voltage is delayed by tdon during the mode 4, current actually flows through the MOSFET Q1 during the mode 1, having no influence upon the operation of the MOSFET Q1. On the other hand, the delay time tdoff affects the MOSFET's Q1 and Q2 to delay turn-off of these MOSFET's and consequently, the voltages Vc1 and Vc2 are charged in excess of the reference voltages. However, the voltage Vc1 is decreased by means of the discharge means 13 during the modes 2 and 3. Similarly, the voltage Vc2 is also decreased by the discharge means 14 during the modes 4 and 1. By determining the values of these discharge means which satisfy the operating frequencies of the MOSFET's Q1 and Q2 as will be described hereinafter with reference to FIG. 7, the influence of the delay time tdoff can be compensated.
3) The discharge means functions to decrease the operating frequency during start of the lighting apparatus and increase the resonance current.

The operation during start mentioned in 3) as above will be described in greater detail. On the assumption that the current during the first period is IL1 in FIG. 3, voltage Vc1 is decreased by ΔV1 by means of the discharge means 13 during the modes 2 and 3 in which no current flows through the MOSFET Q1 and diode QD1. Subsequently, during the mode 4, current flowing through the diode QD1 is integrated and an integral value is subtracted from Vc1, so that voltage Vc1 at the termination of the mode 4 (equal to Vc1 at the beginning of the mode 1 during the second period) is decreased by ΔV1 from the voltage Vc1 at the beginning of the mode 1 during the first period. The operation subsequently proceeds to the second period, during which a value obtained by integrating the current IL in the mode 1 is added to the voltage Vc1. But because of difference in start voltages, the time required for the voltage Vc1 to reach the reference voltage Vref1 becomes longer during the second period than during the first period, that is, the frequency is decreased. When the frequency of the lighting apparatus is decreased in the lagging phase, the current IL increases as shown in the resonance characteristics of FIG. 2. Voltage ΔV2 by which voltage decreases in the modes 2 and 3 during the second period by means of the discharge means 13 is larger than ΔV1 by the decrease of the frequency.

Figure 2:
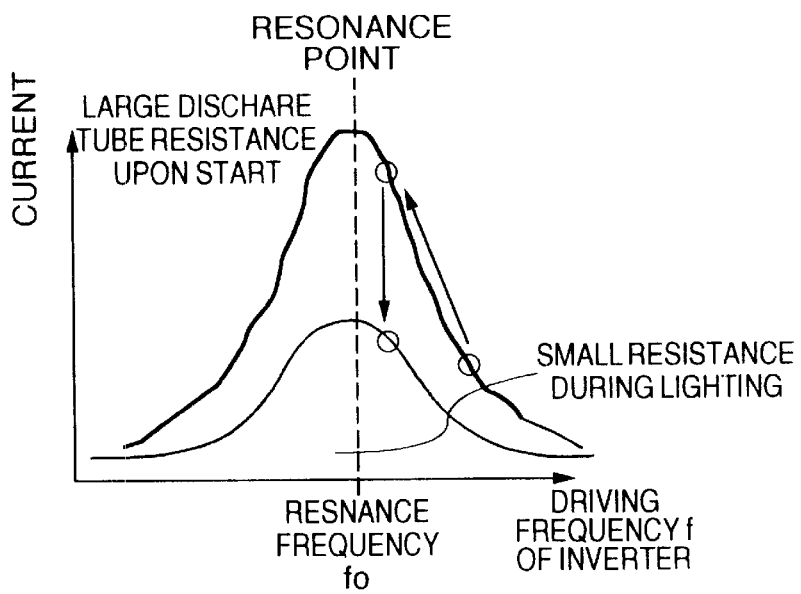
FIG. 2 is a graph showing resonance characteristics of the lighting apparatus and operating points upon start.

The above operation is repeated to make the same operation proceed for voltage Vc2 and as the period repeats by itself, the operating frequency is gradually decreased and the resonance current increases in accordance with the resonance characteristics of FIG. 2.

Figure 5:
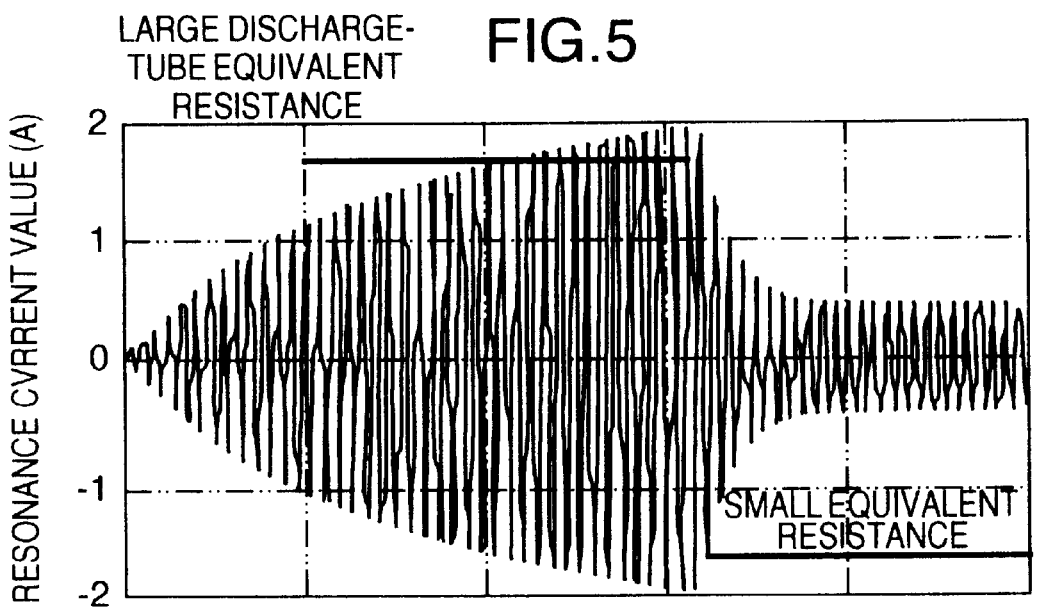
FIG. 5 is a graph showing a current waveform during start.

FIG. 5 shows a current waveform taking place during a time interval in which the discharge tube is controlled such that it is started and lit on the basis of the above principle. It will be seen from the Figure that the current increases every period. When the discharge tube is lit, its equivalent resistance changes and hence the resonance current at the same operating frequency decreases as shown in FIG. 2. Since the current changes with the driving frequency more gradually after the discharge tube is lit than before the discharge tube is lit, the current can be kept to be constant even when the frequency changes slightly, in contrast to the case of the current during start.

The discharge means function as described in the above 2) and 3) and besides, they also have the function of recovering the current to a normal value when the current decreases during lighting.

Figure 6:
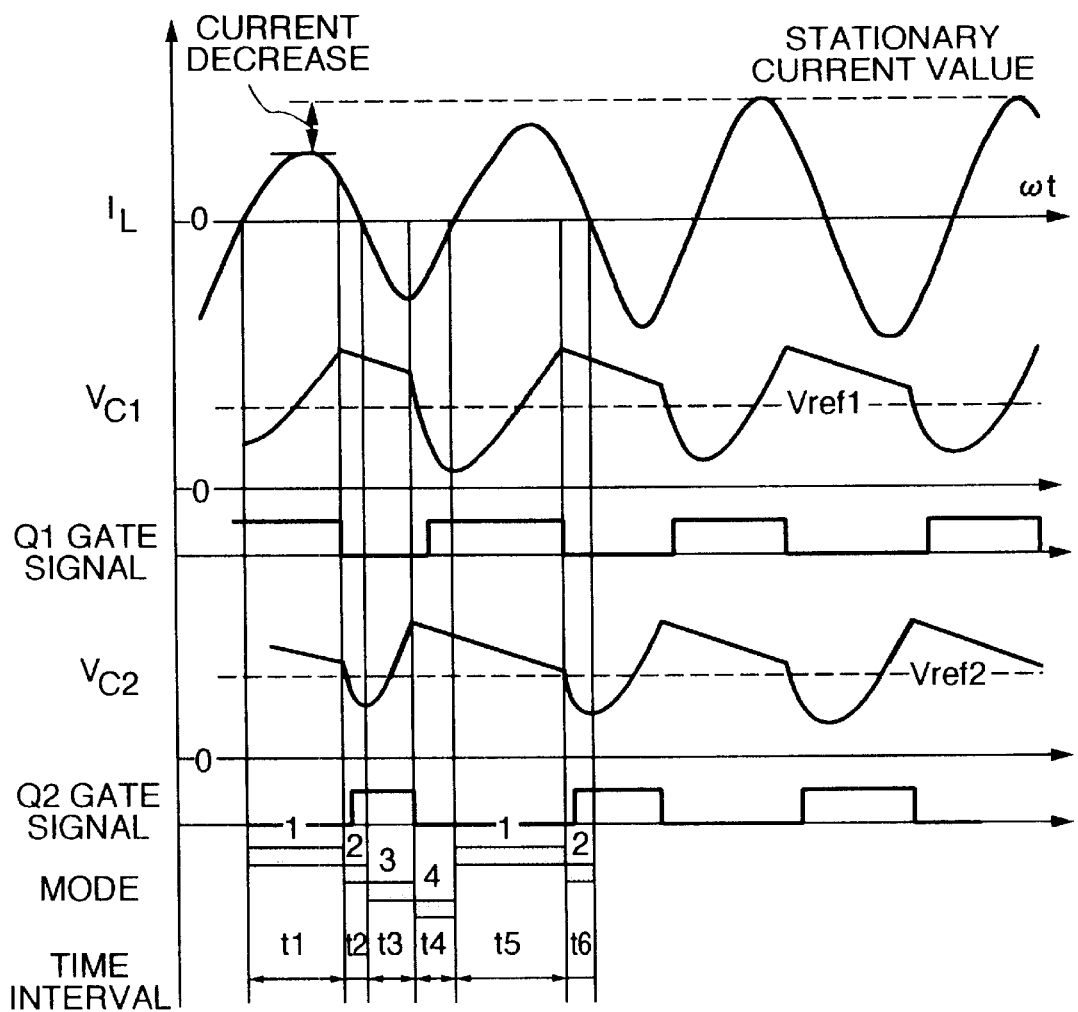
FIG. 6 is a time chart for explaining the operation when the resonance current decreases.

FIG. 6 is useful to explain the operation when current IL decreases. In FIG. 6, the current is decreased in the mode 1 and because of a decrease in current IL, the time required for voltage Vc1 of the capacitor C1 to reach Vref1 is prolonged, that is, the time interval of the mode 1 is extended. This time interval is indicated by t1.

When the conduction duration of Q1 is extended during the positive half period of the current, a time interval in which current flows through the diode QD2 during the next mode 2 is conversely decreased. This time interval is indicated by t2. During the mode 2, voltage Vc2 of the capacitor C2 is counter-charged by current IL flowing through diode QD2 as described previously but the decrease of Vc2 is suppressed when the conduction duration of the diode QD2 is decreased under the influence of the mode 1.

At a time point that the next mode 3 is started, voltage Vc2 is higher than that during normal operation and as current IL starts to flow through the MOSFET Q2, the capacitor C2 is charged with this current and reaches Vref2 earlier. In other words, the time interval of mode 3 is shortened and the negative value of current IL also decreases. This time interval is indicated by t3.

The conduction duration of the MOSFET Q2 is shortened in the mode 3 and therefore, in the next mode 4, the duration of passage of current through the diode QD1 conversely increases. At that time, the capacitor C1 is counter-charged with the current IL and voltage Vc1 is decreased to a value which is lower than that in the preceding period. This time interval is indicated by t4. One period following the decrease of the current ends at the termination of t4.

In mode 1 during the next period, because of voltage Vc1 decreased in the preceding mode, the time required for capacitor C1 to be charged with the current IL so as to cause voltage Vc1 to reach the reference voltage Vref1 is prolonged. This time interval is indicated by t5.

The next mode 2 has a time interval indicated by t6. The capacitor C2 is discharged by means of the discharge means 14 during a resultant time interval of t4 and t5 and the time interval t6 is longer than the corresponding time interval during the preceding period. Consequently, the value of Vc2 at the termination of the time interval t6 becomes lower than that at the beginning of t3. If we define the next mode 3 as t7, this period has a longer time interval than t3 because of decreasing of Vc2 and the current IL tends to increase.

Figure 7:
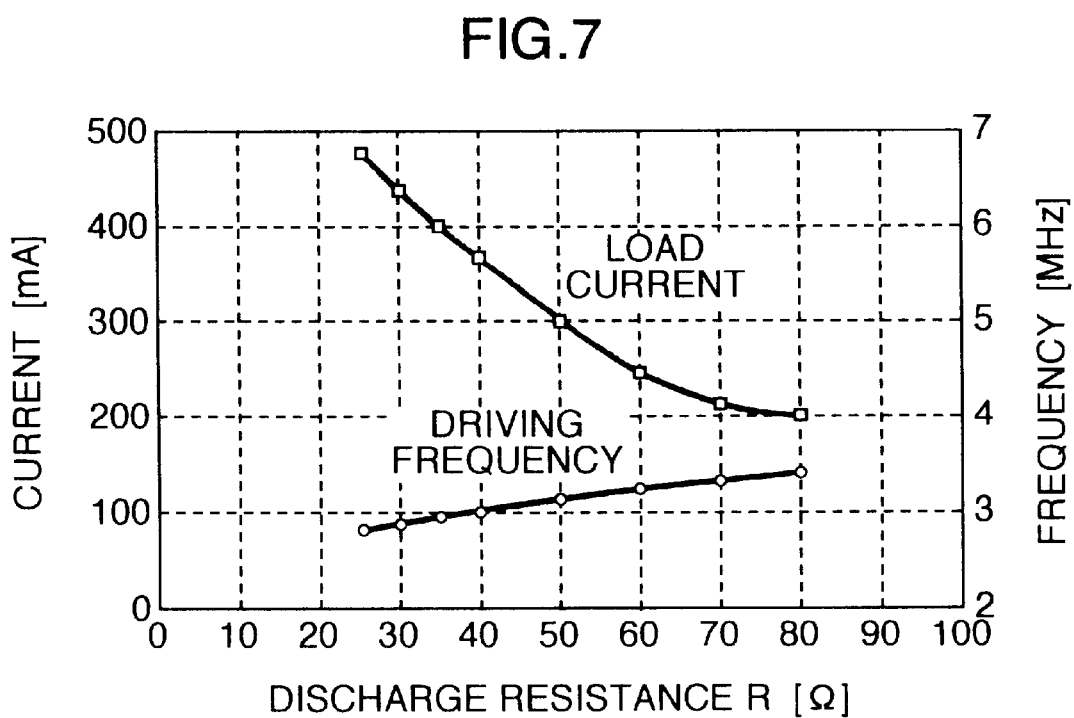
FIG. 7 is a graph showing the relation between the value of discharge means and each of the frequency and the current.

According to the lighting circuit of the present invention, even when the current decreases abruptly, the time intervals t5 and t6 during the next period are prolonged to thereby decrease the frequency and increase the current. This operation is repeated until stationary current is recovered and thereafter the frequency becomes constant. In other words, the present lighting circuit features in that as the current varies, the driving frequency of the switching device and the on/off ratio of one period (duty ratio) are automatically adjusted every period of resonance to stabilize the current. When the same resistance is used for both the discharge means 13 and 14, the discharge resistance is related to the load current IL and the driving frequency of MOSFET's Q1 and Q2 as shown in FIG. 7. Curves in FIG. 7 represent values calculated on condition that circuit constants other than the discharge means 13 and 14 are the same as those of the FIG. 1 embodiment. When the discharge resistance indicated in FIG. 7 is made to be larger, a temporal decrease in voltage determined by the capacitor C1 or C2 and the discharge resistance is made to be smaller and ΔV shown in FIG. 3 is increased. As a result, the driving frequency increases and the load current is decreased as will be seen from the resonance characteristics of FIG. 2.

In the illumination lighting apparatus, lighting control is generally effected by changing the load current and according to the present invention, lighting control can particularly be achieved by controlling the value of the discharge means to change the load current in the light of the relation shown in FIG. 7. The lighting control will be described later.

Next, a start/stop method in the FIG. 1 embodiment will be described.

In starting, the switches S1 and S2 are initially turned on and then, the switch S1 is first turned off by applying a signal to the switch S1. The MOSFET Q1 is turned on to supply current IL to the resonance circuit and as charging of the capacitor C1 proceeds, the MOSFET Q1 is turned off as described in connection with the operation in mode 1. Subsequently, mode 2 is started and voltage of the capacitor C1 falls below Vref2 but so long as the switch S2 is turned on, the output of the NAND circuit 7 keeps the MOSFET Q2 turned off. It is important in this phase that the voltage of capacitor C1 decreases by the action of the discharge means 13 and therefore, a signal for turning off the switch S2 is applied thereto before Vc1 reaches Vref1.

If the switch S2 is turned off after Vc1 falls below Vref1, then the MOSFET's Q1 and Q2 will be turned on simultaneously to set up a short-circuit state. In the embodiment of FIG. 1, if the MOSFET's Q1 and Q2 are turned on simultaneously, then both the capacitors C1 and C2 will be charged in excess of the reference voltages by a short-circuit current passing through these devices and the two devices are turned off. In other words, the short-circuit current can be cut safely but in addition, the supply of current to the load is also interrupted. To avoid this inconvenience, by taking advantage of the fact that when voltage Vc1 reaches Vref1 to turn off the MOSFET Q1, the capacitor C2 is counter-charged in the mode 2, a counter-charge voltage of the capacitor C2 is detected to turn off the switch S2. Thereafter, current flows in the aforementioned mode 3. In order to stop the operation, the switches S1 and S2 are turned on to make the outputs of the NAND circuits 5 and 6 high.

For the purpose of turning on/off the switch S1, a signal based on a reference of low-side common potential must be converted to a signal based on a reference of high-side common potential and must be transmitted to the high side. Thus, a level shift means is required for transmission of a signal to a site at different potential and to this end, a photo-coupler or a pulse transformer is generally used and besides, a level shift circuit constructed of an integrated circuit of high breakdown voltage has recently been used widely. While the photo-coupler or the pulse transformer has a large parts packaging volume, the level shift circuit of high breakdown voltage can be built in a semiconductor integrated circuit, together with the high-side and low-side drive circuits and can be effective for size reduction of the unit. However, to prevent electrical interference between the high-side and low-side circuits in the integrated circuit, high breakdown voltage separation between devices is needed. The inter-device separation makes the production process of the integrated circuit complicated and in addition, increases the chip area, thus raising costs of the integrated circuit. A second embodiment shown in FIG. 8 is to cope with the above problems.

Figure 8:
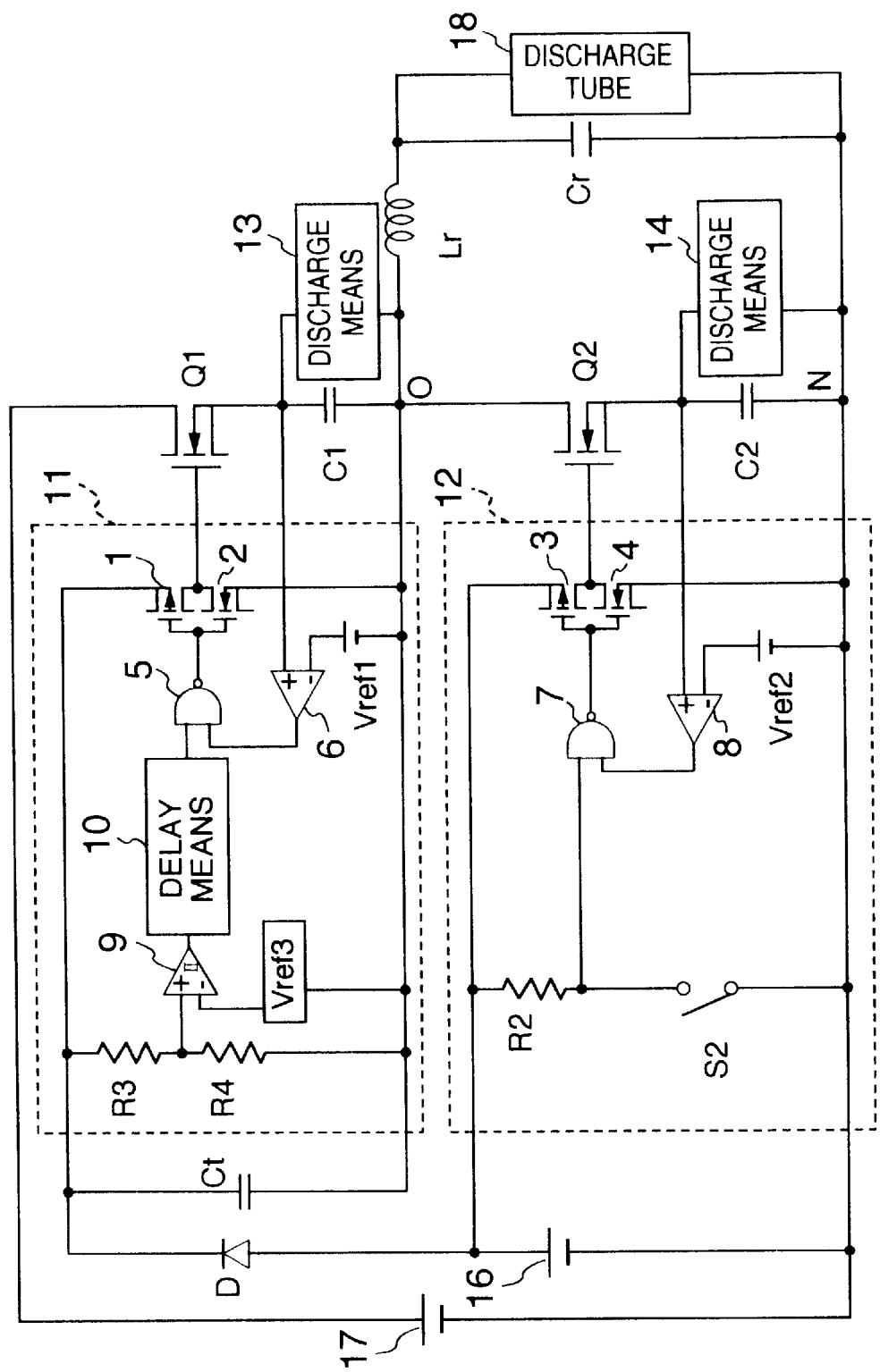
FIG. 8 is a circuit diagram showing a second embodiment of the lighting apparatus for illumination.

In the FIG. 8 embodiment, the main circuit is constructed similarly to that in FIG. 1 and will not be described. A power source in association with a high-side drive circuit 11 is a capacitor Ct which is charged from a drive power source 16 based on a reference at point N through a diode D by turning on a power MOSFET Q2. This method is called a bootstrap method and is described in U.S. Pat. No. 4,316,243. CMOS inverters using devices 1 and 2, a comparator 6, a NAND circuit 5, a delay means 10, a comparator 9 and a series connection of resistors R3 and R4 are connected between positive potential and negative potential of the capacitor Ct.

An output of the CMOS inverter is connected to a gate of power MOSFET Q1 and a signal from the NAND circuit 5 is applied to a control terminal of the CMOS inverter. The NAND circuit 5 receives an input signal from the comparator 6 and an input signal from the comparator 9 through the delay means 10. Like the comparator 6 in FIG. 1, the comparator 6 compares a voltage of capacitor C1 with a reference voltage Vref1. A voltage of the capacitor Ct is divided by the resistors R3 and R4 and the comparator 9 compares a voltage across the resistor R4 with a reference voltage Vref3. An output of the comparator 9 is delayed by a desired time by means of the delay means 10 and then transmitted to the NAND circuit 5.

Preferably, the comparator 9 has a hysteresis characteristic so that a reference voltage for causing the output of the comparator to change from low to high may be VCLH and conversely a reference voltage for causing the output of the comparator to change from high to low may be VCHL. Here, the comparator is so designed as to produce a high output when the divisional voltage obtained by dividing the voltage of capacitor Ct by the resistors R3 and R4 is higher than the reference voltage Vref3 of VCLH, and so the relation of VCHL<VCLH is set up.

A low-side drive circuit 12 is associated with the drive power source 16 based on the reference at point N. A CMOS inverter using devices 3 and 4, a comparator 8, a NAND circuit 7 and a series connection of resistor R2 and switch S2 serving as a start/stop means as in the case of FIG. 1 are connected between positive potential and negative potential of the drive power source 16. An output of the CMOS inverter is connected to a gate of the MOSFET Q2 and a signal from the NAND circuit 7 is applied to a control terminal of the CMOS inverter. The NAND circuit 7 receives input signals from the comparator 8 and the start/stop means. The comparator 8 compares a voltage of capacitor C2 with a reference voltage Vref2.

Next, a starting method in the FIG. 8 embodiment will be described. It is now assumed that all capacitors C1, C2, Ct and Cr have an initial voltage of 0 volt. When a gate/source capacitance of the MOSFET Q2 is Cgs2, the capacitor C2 is so selected as to satisfy the relation of Cgs2<<C2. Similarly, when a gate/source capacitance of the MOSFET Q1 is Cgs1, the capacitor Q1 is so selected as to satisfy the relation of Cgs1<<C1.

Initially, the switch S2 is turned off and if voltage Vc2 of the capacitor C2 is lower than Vref2, the device 3 of the CMOS inverter is turned on by the output of the comparator 8 and the output of the switch S2 to charge the gate voltage of Q2. From the relation Cgs2<<C2, almost all the voltage of the power source 16 is applied across the gate and source of the MOSFET Q1. Even with the gate voltage applied to the MOSFET Q2, no current flows through the resonance circuit serving as a load. On the other hand, a current flows from the power source 16 through diode D, capacitor Ct, MOSFET Q2 and capacitor C2 to charge the capacitors Ct and C2. The voltage of the power source 16 is divided by the capacitors Ct and C2 and here, the capacitance of the capacitor Ct is so selected as to meet conditions that divisional voltage Vc2 across the capacitor C2 is in excess of Vref2 and divisional voltage Vct across the capacitor Ct is in excess of the aforementioned VCLH. As a result, the comparator 8 detects that Vc2 exceeds Vref2 and transmits a signal for turning off the MOSFET Q2 to the NAND circuit 7.

As voltage Vct of the capacitor Ct exceeds VCLH, the comparator 9 detects the excess and a detection result is transmitted to the NAND circuit 5 through the delay means 10. The initial voltage of the capacitor C1 is 0 volt and if a voltage of the capacitor C1 is lower than Vref1, the NAND circuit 5 meets a condition of turning on the MOSFET Q1. The provision of the delay means 10 is important because in order to prevent the MOSFET Q1 from being turned on before the MOSFET Q2 is turned off, the delay means adds a predetermined delay time to the output of the comparator 9.

With the MOSFET Q1 turned on, the same operation as that in mode 1 described in connection with FIGS. 3 and 4 is started. This operation proceeds as described previously and will not be described herein. As mode 1 ends and shifts to mode 2, the capacitor C2 is counter-charged by current IL flowing through diode QD2 and at the same time, voltage V0 at point O based on the reference at point N is the sum of a voltage across diode QD2 (negative polarity) and voltage Vc2 across the capacitor C2. Since this resultant voltage is lower than the power source 16, a current flows from the power source 16 through a path of diode D, capacitor Ct, diode QD2 and capacitor C2 to charge the capacitor Ct serving as the high-side power source. The capacitor C2 is charged with this current and at the same time, counter-charged by the current IL. On the assumption that the current IL is larger than the charge current of the capacitor Ct, only the capacitor Ct is charged.

In the FIG. 8 embodiment, the high-side drive circuit 11 need not externally receive the signal for start/stop in contrast to the FIG. 1 embodiment. In the embodiment of FIG. 8, the operation through the aforementioned modes 1 to 4 continues so long as the power source capacitor Ct is charged to a predetermined value or more in accordance with the operation of the low-side MOSFET Q2. The operation can be stopped by applying a stop signal to the switch S2 of the low-side drive circuit 12 to keep the MOSFET Q2 turned off. More particularly, when the MOSFET Q2 is kept to be turned off, charging of the capacitor Ct is stopped and charge voltage of the capacitor Ct gradually decreases. As the charge voltage of the capacitor Ct falls below the reference voltage Vref3, the MOSFET Q1 is turned off by the comparator 9.

As described above, in the FIG. 8 embodiment, there is no need of providing any level shift means in the high-side drive circuit 11. Accordingly, the drive circuits 11 and 12 can be realized in the form of separate semiconductor integrated circuits of low breakdown voltage. According to the present embodiment, costs can be reduced when compared to the semiconductor integrated circuit of high breakdown voltage incorporating the level shift circuit as described previously.

The embodiments of FIGS. 1 and 8 have mainly been described as being the high-frequency lighting apparatus for the load current IL of several of MHz but these embodiments can also be applied to an ordinary fluorescent lamp lighting apparatus handling frequencies of about 50 kHz. In such a case, however, delay times tdon and tdoff shown in FIG. 3 are negligibly small in comparison with the duration of one period. More particularly, as soon as voltage Vc1 or Vc2 reaches the reference voltage Vref1 or Vref2, the MOSFET Q1 or Q2 is immediately turned off. Subsequently, the voltage Vc1 or Vc2 is caused to start decreasing by the discharge means 13 or 14 and falls below the reference voltage, so that the MOSFET Q1 or Q2 is again turned on. For avoidance of such an operation as above, the reference voltage is desired to have hysteresis.

Figure 9:
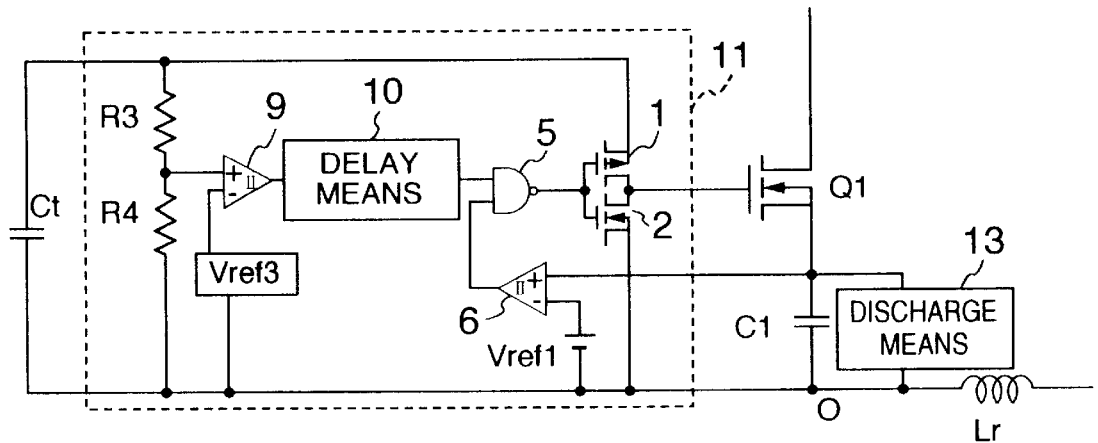
FIG. 9 is a fragmentary circuit diagram showing an embodiment using a hysteresis comparator.

FIG. 9 shows an embodiment in which a hysteresis comparator is used as the comparator 6. In the Figure, only the high-side circuit is illustrated but it is to be noted that a hysteresis comparator is similarly used as the comparator 8 in the low-side circuit. Components other than the comparator 6 are identically constructed to those in FIG. 8 and will not be described. The comparator 6 has such a hysteresis characteristic that the reference voltage for causing the output of the comparator to change from low to high is VLH and conversely the reference voltage for causing the output to change from high to low is VHL, and the relation of VHL>VLH is set up. Both of the reference voltages VLH and VHL are generated by switching the reference voltage Vref1 in accordance with the output of the comparator 6.

Figure 10:
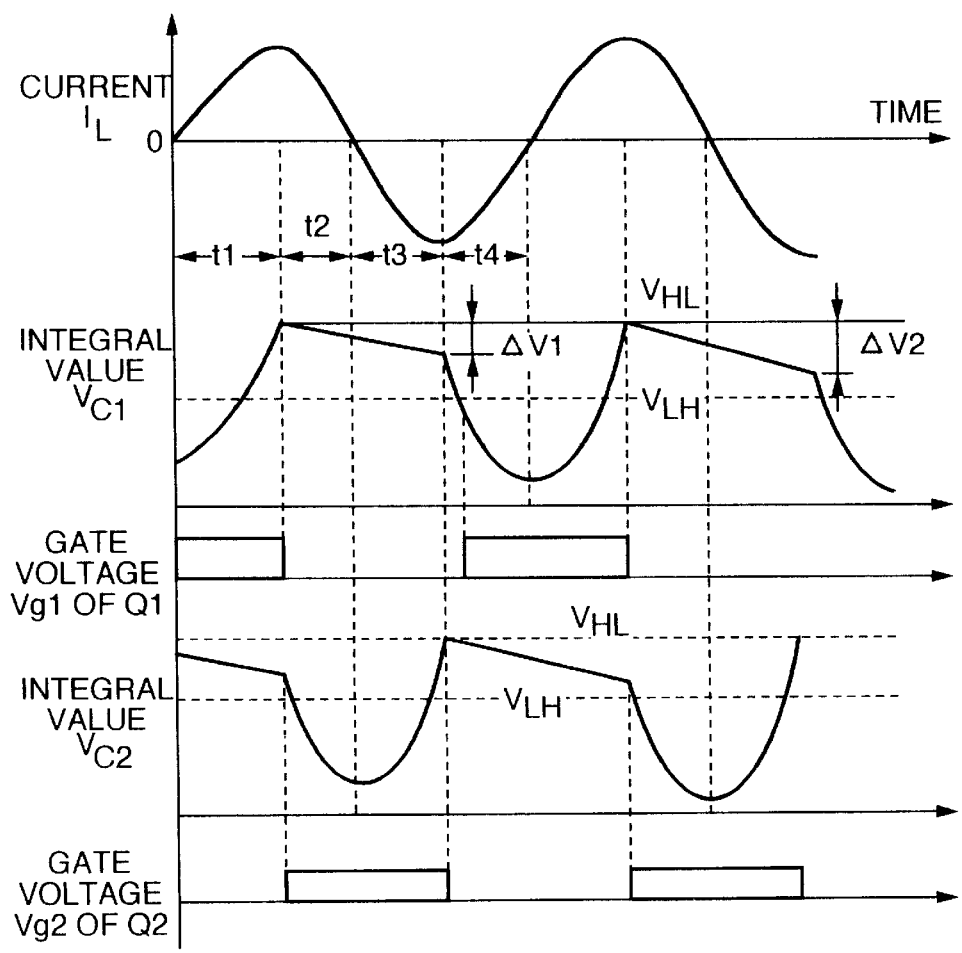
FIG. 10 is a time chart showing the operation when the hysteresis comparator is used.

FIG. 10 shows the operation when the hysteresis comparator is used. In the Figure, the value of Vref1 is VHL in mode 1 of t1 time interval. Then, as Vc1 reaches VHL, the output of the comparator 6 changes from high to low and concurrently therewith, the reference voltage Vref1 changes from VHL to VLH. Subsequently, in mode 2 of t2 time interval, the voltage Vc1 is decreased by the discharge means 13 similarly to FIG. 3 but even when the voltage Vc1 falls below the previous VHL in this phase, this is not influential and the output of the comparator 6 does not change unless the voltage Vc1 falls below VLH. Current IL flows to counter-charge the capacitor C2 and as voltage Vc2 falls below VLH which represents the value of Vref2, the output of the comparator 8 changes from low to high and this output is received by the NAND circuit 7, so that the gate voltage of the MOSFET Q2 is charged and the reference voltage Vref2 is switched from VLH to VHL. In the next mode 3, the capacitor C2 is charged with current IL and the comparator 8 compares the voltage Vc2 with the reference voltage Vref2 which is switched to VHL in the mode 2. Then, as the voltage Vc2 increases to reach VHL, the output of the comparator 8 changes from high to low, the MOSFET Q2 is turned off and thereafter, the reference voltage Vref2 is switched from VHL to VLH. Subsequently, the operation proceeds to mode 4 and as the current IL counter-charges the capacitor C1 and Vc1 falls below VLH representing the value of Vref1, the output of the comparator 6 changes from low to high to charge the gate voltage of MOSFET Q1. The change of output of the comparator 6 switches the reference voltage Vref1 from VLH to VHL and the operation returns to the initial state.

As described above, when the hysteresis comparators are used as the comparators 6 and 8, normal operation of the MOSFET's Q1 and Q2 can be warranted by setting the reference voltage value at the termination of t3 or t1 such that it does not fall below VLH even when the voltages Vc1 and Vc2 are decreased by the discharge means 13 and 14.

In the FIG. 1 embodiment, common potential of the high-side circuit 11 is at output 0. Advantageously, this permits high-speed turn-off of the MOSFET Q1 in the mode 2 in which the device 2 is turned on. More particularly, immediately after the device 2 is turned on, the voltage charged between the gate and source of the MOSFET Q1 is applied to the device 2 and the current of the device 2 becomes large; but as the gate voltage of the MOSFET Q1 decreases, the current capability is degraded proportionately to approach of the gate voltage of the MOSFET Q1 to zero. However, with common potential of the high-side circuit 11 connected to output 0, the current capability can be maintained until the end of turn-off of voltage Vc1 applied to the device 2. After the turn-off, the Vc1 voltage is applied as a backward bias between the source and gate of the MOSFET Q1 and consequently, the MOSFET Q1 can be prevented from being turned on instantaneously by noise and stable turn-off operation can be ensured.

On the other hand, the voltage applied between the gate and source of the MOSFET Q1 is a difference voltage between the voltage of power source 15 and Vc1 and as the voltage Vc1 increases, the gate voltage of the MOSFET Q1 is decreased. This leads to a disadvantage that on-resistance of the MOSFET Q1 increases. Especially when the MOSFET's Q1 and Q2 have a stationary loss which is larger than a switching loss in an application where the driving frequency is about several of tens of kHz, a gate voltage sufficient to prevent the on-resistance of Q1 from increasing is desired to be applied. In such a case, the connection of the comparator 6 is preferably changed to that shown in an embodiment of FIG. 11.

Figure 11:
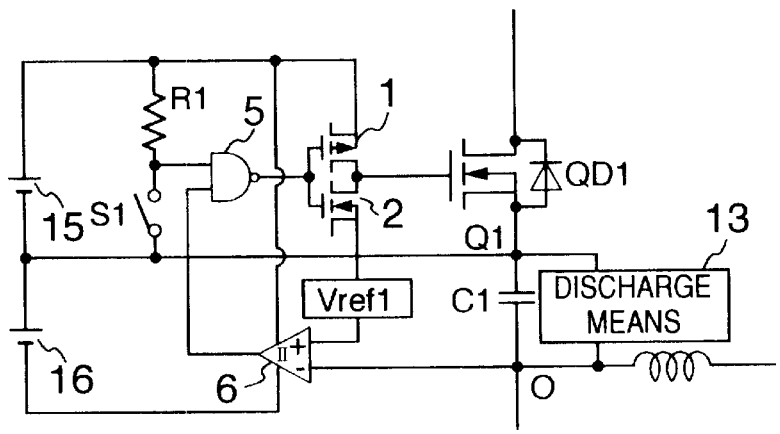
FIG. 11 is a fragmentary circuit diagram showing another connecting method of the comparator.

FIG. 11 shows a high-side drive circuit 11. A low-side drive circuit 12 is similarly constructed. In FIG. 11, the drive circuit 11 is associated with a power source which includes a positive power source 15 and a negative power source 16, these power sources being based on a reference of a source of MOSFET Q1. A CMOS inverter comprised of devices 1 and 2 is connected between positive and negative polarities of the power source 15 and an output of the CMOS inverter is connected to a gate of the MOSFET Q1. As in FIG. 1, a signal from a NAND circuit 5 is applied to a control terminal of the CMOS inverter comprised of the devices 1 and 2. A comparator 6 compares a voltage of capacitor C1 with a reference voltage Vref1 based on a reference at the source of Q1 and an output of the comparator 6 is inputted to the NAND circuit 5. A series connection of resistor R1 and switch S1 serving as a start/stop means is connected across the power source 15 and a connecting node of the resistor R1 and switch S1 is connected to an input of the NAND circuit 5. The comparator 6 is fed from the positive power source 15 and the negative power source 16. Preferably, the comparator 6 has a hysteresis characteristic. Since the comparator 6 is associated with the negative power source 16, a comparison with the reference voltage can be ensured even when the voltage of the capacitor C1 is negative.

With the construction of FIG. 11, even when the charge voltage of the capacitor C1 increases, the gate/source voltage of the MOSFET Q1 can be maintained at the voltage of the power source 15. But the aforementioned speed-up of turn-off obtained when the point O is selected as the common of the circuit 11 cannot be achieved. Accordingly, selection of either the FIG. 1 construction or the FIG. 11 construction must be determined in accordance with the driving frequency.

Next, a method of adjusting the brightness of the discharge tube will be described. In recent years, a lighting apparatus having the lighting control function for desirably controlling the brightness has been available as an illumination appliance. The brightness of the discharge tube can be adjusted by changing the magnitude of the resonance current IL. The aforementioned FIG. 2 shows that as the switching frequency f of the inverter becomes higher than the resonance frequency fo determined by the resonance inductor and the resonance capacitor, the current IL decreases. In the lighting apparatus, the switching frequency f is controlled based on this principle to perform lighting control.

For the purpose of decreasing the current IL, the conduction duration of the high-side or low-side switching device is set to be short and the switching frequency is set to be high.

Figure 12:
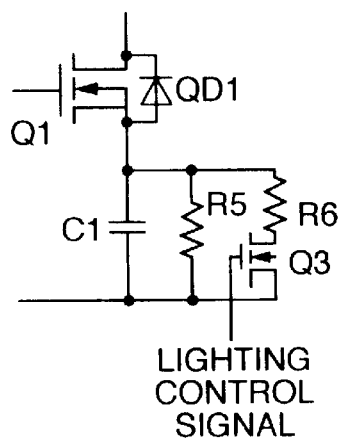
FIG. 12 is a circuit diagram of an embodiment of a lighting control circuit.

According to the present invention, by increasing the resistance of the discharge means 13 and 14, the driving frequency can be increased and the current can be decreased as will be seen from FIG. 7. In the foregoing, the discharge means is described as having the function of decreasing the operating frequency to increase the resonance current during start of the lighting apparatus. Thus, by increasing the discharge resistance to decrease a reduction ΔV of voltages Vc1 and Vc2 on the basis of this principle, the operating frequency can be increased and the resonance current can be decreased. FIG. 12 shows an embodiment in which lighting control is carried out based on this principle. Only a peripheral circuit of the discharge means 13 is depicted in FIG. 12 because the remaining components are identical to those of FIG. 1. The discharge means 14 is also associated with a circuit similar to that of FIG. 12. A resistor R5 is connected in parallel with the capacitor C1 and a series connection of resistor R6 and MOSFET Q3 is also connected in parallel with the capacitor C1. In the case where the total light is lit, the MOSFET Q3 is turned on by a lighting control signal to make the value of the discharge means equal to a parallel resultant value of resistances of the resistors R5 and R6. In the case of lighting control, the MOSFET Q3 is turned off and only the resistor R5 acts as the discharge means. Since the resistance of the resistor R5 is larger than the parallel resultant resistance of the resistors R5 and R6, the driving frequency increases and the current decreases as shown in FIG. 7 to establish a lighting control state.

Figure 13:
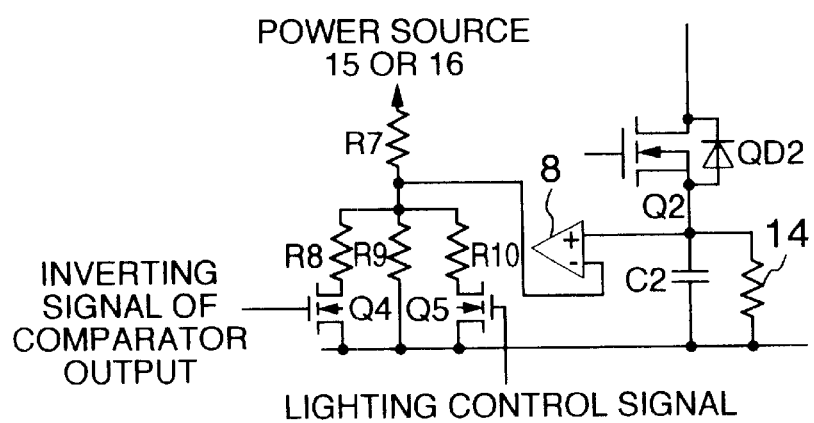
FIG. 13 is a circuit diagram of another embodiment of the lighting control circuit.

In addition to the FIG. 12 embodiment, a method may be adopted in which the reference voltage is controlled such that the time required for the voltage of the capacitor C1 or C2 to reach the reference voltage Vref is shortened. FIG. 13 shows an embodiment of lighting control circuit directed to changing of the reference voltage.

In the previously-described embodiment of FIG. 1, the low-side drive circuit employs the comparator 8 which compares the voltage of the capacitor C2 with the reference voltage Vref2 and delivers a signal to the NAND circuit 7. On the other hand, the embodiment of FIG. 13 features in that the reference voltage Vref2 of the comparator 8 can be changed by a lighting control signal applied at a desired timing.

In FIG. 13, a resistor R7 is connected to the high potential side of the power source 16 in FIG. 1. A signal obtained by inverting the output of the comparator 8 is applied to a gate terminal of an FET Q4 and a lighting control signal is transmitted to a gate terminal of an FET Q5.

Firstly, a method of setting the reference voltage Vref2 during the total light lighting will be described. When the output of the comparator 8 is high, the FET Q4 is turned off and the reference voltage Vref 2 takes a value of VHL which is obtained by dividing the voltage of power source 16 by resistors R7 and R9. Subsequently, the output of the comparator 8 becomes low to turn on the FET Q4 and the resistors R8 and R9 are connected in parallel with each other to have a resultant resistance which is smaller than the resistance of R9. The reference voltage Vref2 takes a value of VLH which is obtained by dividing the voltage of power source 16 by the resultant resistance of R8 and R9 and the resistor R7 and the relation VHL>VLH is established between VHL and VLH.

Operation proceeds as will be described below when a lighting control signal is inputted. With a gate terminal of the FET Q5 applied with a high signal representing the lighting control signal, the FET Q5 is turned on and resistors R9 and R10 are connected in parallel with each other to have a resultant resistance which is smaller than the resistance of R9. As a result, the reference voltage Vref2 falls below VHL for the normal lighting and the conduction duration of the MOSFET Q2 can be decreased. By changing the low-side reference voltage Vref2 in this manner, the lighting control can be ensured.

Figure 14:
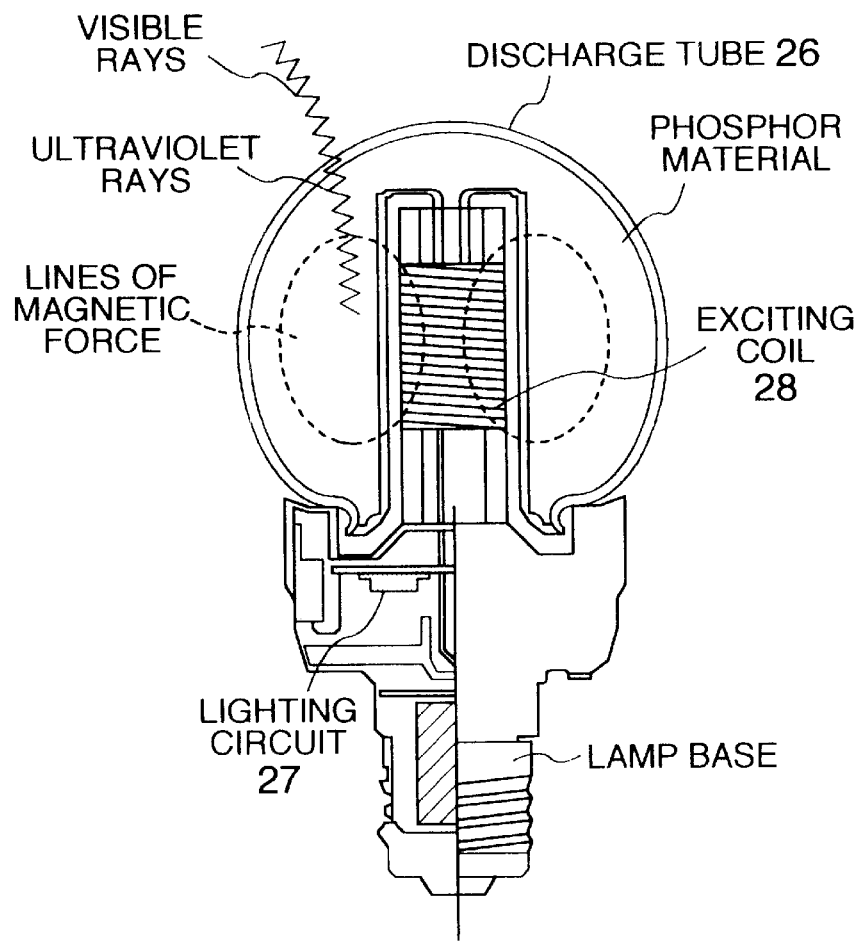
FIG. 14 is a perspective view, partly exploded, of an embodiment of an electrodeless fluorescent lamp incorporating a lighting circuit.

FIG. 14 shows the construction of an electrodeless fluorescent lamp incorporating the lighting circuit of the present invention. krypton and mercury vapor are filled in a discharge tube 26. When a high-frequency voltage is applied to an exciting coil 28 by means of a lighting circuit 27, a large electric field is generated by a voltage across conductors of the coil to cause original discharge which shifts to inductive discharge. Thereafter, the lighting circuit 27 supplies a high-frequency current of several of MHZ to the coil 28, causing the coil of solenoidal shape to emit lines of magnetic force. Ions generated by the inductive discharge are electromagnetically coupled with the lines of magnetic force so as to be applied with an inductive electric field and result in a closed loop discharge current (plasma). The mercury vapor in the plasma is excited by the inductive electric field to emit ultraviolet rays which impinge upon a phosphor material coated on the inner surface of the tube 26 to produce visible rays. The plasma is equivalent to a secondary winding of exciting coil 28 and supplies energy to a plasma resistor corresponding to a load on the secondary winding. The electrodeless fluorescent lamp has a ring-shaped discharge path and need not be long, having suitability to miniaturization.

Advantageously, the electrodeless fluorescent lamp differs from ordinary fluorescent lamps in that the filament is not used and therefore it can have a long life. An ordinary bulb lamp type fluorescent lamp to be described later has a life of about 8,000 hours and the factor of determining the life is breakage of the filament. Contrary to this, the electrodeless fluorescent lamp can have a life of about 20,000 hours which is about three times longer than the life of the ordinary fluorescent lamp. This life is about 10 times the life of an incandescent lamp.

As in the case of the ordinary fluorescent lamp, a voltage across the electrodeless fluorescent lamp decreases as current flowing through the lamp increases. When the lamp is considered in terms of equivalent resistance, this corresponds to such a characteristic that the more the flow of current, the more the resistance decreases, which characteristic is called a negative resistance characteristic. It is the function of the lighting circuit to stabilize the current in the lamp having the negative resistance characteristic.

Figure 15:
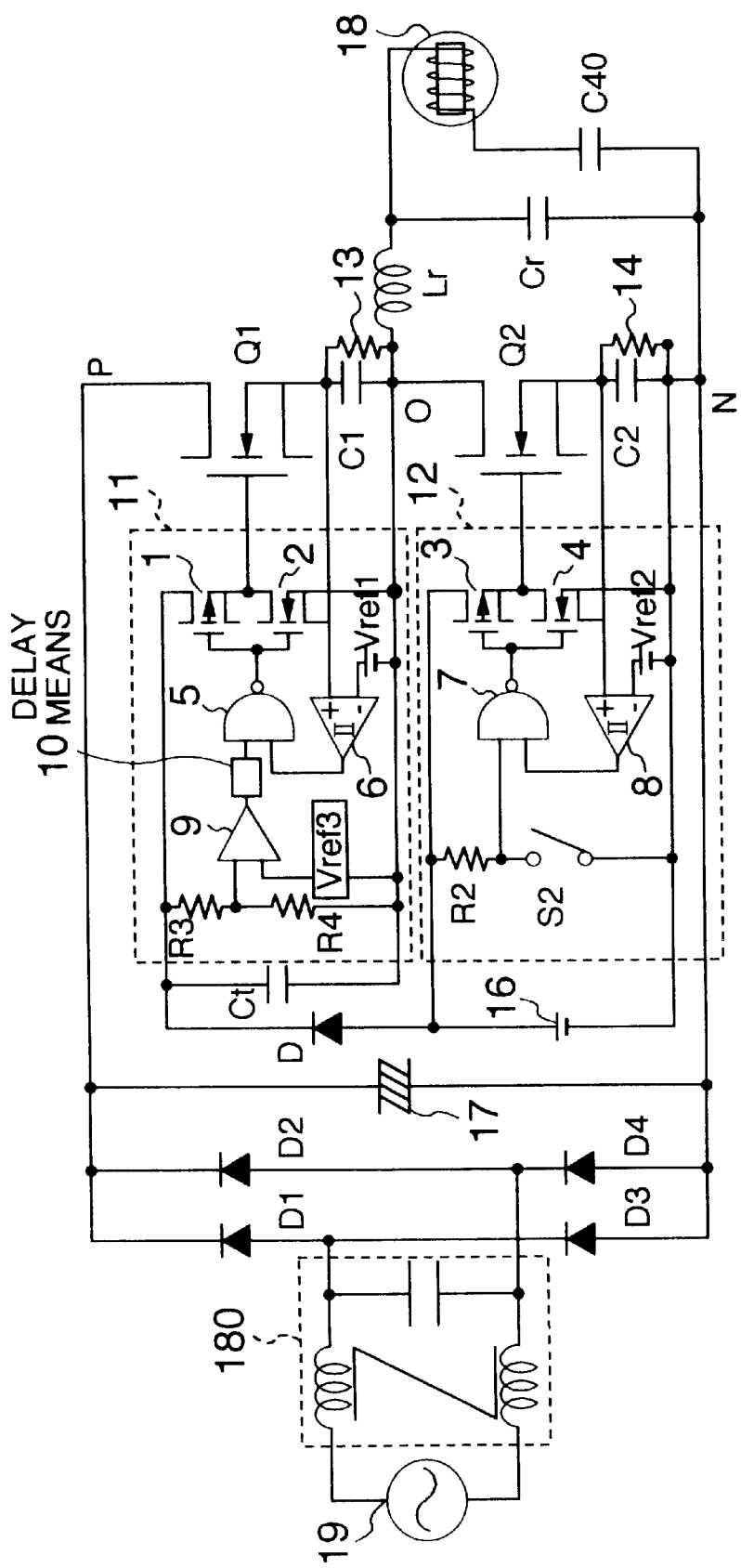
FIG. 15 is a circuit diagram of an embodiment of the lighting circuit for electrodeless fluorescent lamp.

Referring to FIG. 15, there is illustrated a concrete embodiment in which the lighting circuit of the present invention is applied to the electrodeless fluorescent lamp. In FIG. 15, MOSFET's Q1 and Q2 having sources connected to capacitors C1 and C2, control means 11 and 12 for driving these MOSFET's and a high-side power supply using bootstrap are constructed similarly to those shown in FIG. 8 and will not be described.

Reactor LR and capacitor Cr for resonance are connected in series between an output terminal O and a common point N, and an electrodeless fluorescent lamp 18 and an auxiliary capacitor C40 are connected across the capacitor Cr. In a converter for receiving power from an AC power source 19, AC current is passed through a rectifier circuit using a low-pass filter 18 and diodes D1 to D4 so as to be rectified and the rectified current charges a smoothing capacitor 17 which in turn supplies smoothed current to the MOSFET's Q1 and Q2.

Figure 16:
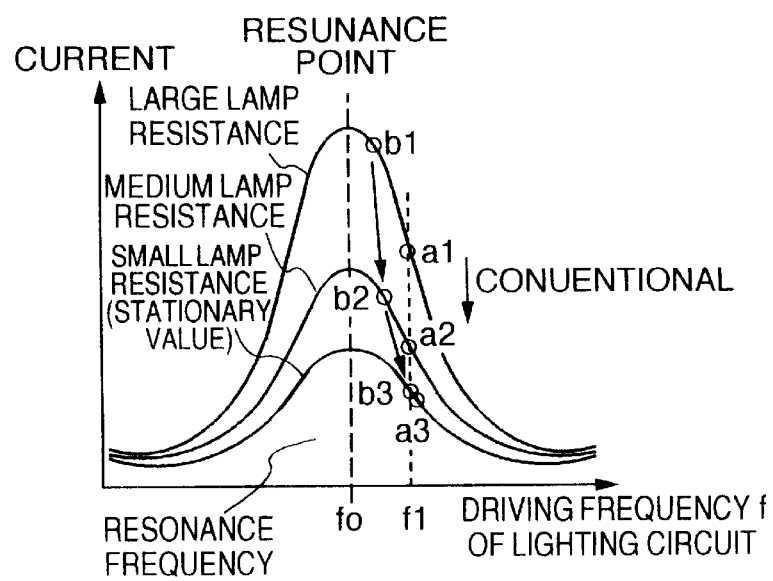
FIG. 16 is a graph for explaining the operation during parallel resonance.

The circuit configuration in which the lamp 18 representing a load is connected in parallel with the resonance capacitor Cr or reactor Lr as in the case of the FIG. 15 embodiment is called a parallel resonance circuit. The relation between driving frequency and resonance current in the lighting circuit in the case of parallel resonance is shown in FIG. 16. Characteristics shown in FIG. 16 are substantially identical to those shown in FIG. 2, with the only exception that three values, large, medium and small, of lamp resistance are indicated as parameters in FIG. 16.

In the case of the parallel resonance, the higher the load resistance at the same frequency, the larger the current becomes. In the conventional lighting circuit, the driving frequency is constant amounting to, for example, f1 and the current changes with the lamp resistances as indicated at a1, a2 and a3 in FIG. 16. On the other hand, according to the lighting circuit of the present invention, when the current is desired to be decreased, the driving frequency is automatically increased. By handling a current equal to the conventional current at a3 as stationary value and designing the lighting circuit of the present invention by indicating the stationary value at b3, the frequency is lowered from that for b3 when the resistance is large or medium and currents of b1 and b2 are supplied. This means that for the same lamp resistance, a larger current than the conventional current is supplied.

In the electrodeless fluorescent lamp, the plasma load is loaded on the plasma corresponding to the secondary winding of the exciting coil as described previously. The plasma resistance depends on temperatures in the discharge tube and the lower the temperature, the higher the resistance becomes. This tendency is eminent when the lamp is lit in a low-temperature environment, giving rise to a high lamp resistance which leads to dark illumination. The lighting circuit of the present invention features in that in the low-temperature lighting, a larger current than the conventional current is supplied to attain bright illumination. In the initial phase of lighting, low temperatures prevail to supply a current at b2 but because of the previously-described negative resistance, an increase in current leads to a decrease in lamp resistance and the current can be stabilized.

An electrodeless fluorescent lamp using a different lighting circuit has already been practiced but the lighting circuit is of the type which supplies a high-frequency current of several of MHz and has no lighting control function. In the lighting circuit of the present invention, however, the current can be changed by changing the values of the discharge resistances 13 and 14 to ensure that non-step lighting control can be carried out. The method of changing the frequency during lighting control has been used in the conventional fluorescent lamp lighting circuit but expectantly, in the case of the high frequency of several of MHz, the current waveform will be disturbed or the problem of short-circuit due to simultaneous turn-on of the FET's Q1 and Q2 will be raised when the frequency is changed. Contrary to this, in the present invention, the frequency is adjusted slightly and automatically every period of resonance and therefore stable lighting control can be ensured even at high frequencies of several of MHz.

Further, even if the FET's Q1 and Q2 are turned on simultaneously and short-circuit occurs, the lighting circuit of the present invention functions to automatically interrupt a short-circuit current and thereafter restart the operation. With the FET's Q1 and Q2 turned on simultaneously, a current passing through the FET's Q1 and Q2 flows from the smoothing capacitor 17 and this current reaches a value which is determined by a saturation current of the FET Q1 or Q2. On the other hand, the short-circuit current passes through the capacitors C1 and C2 without fail, with the result that the capacitors C1 and C2 are charged with a larger current than that during lighting and the increase of voltage of each capacitor is accelerated. The saturation current of voltage driven type device decreases as the gate voltage decreases. The gate voltages of the FET's Q2 and Q1 are represented by a value obtained by subtracting the voltage of C2 from the drive power source 16 and a value obtained by subtracting the voltage of C1 from the voltage of Ct, respectively. Therefore, as the voltages of the capacitors C1 and C2 increase in accordance with the short-circuit current, the gate voltages decrease conversely to reduce the saturation current (namely, short-circuit current). By virtue of the negative feedback function, the short-circuit current is automatically lowered and therefore, it is warranted in the lighting circuit of the present invention that breakage of the MOSFET's due to short-circuit does not occur. Further, when the voltages of the capacitors C1 and C2 increase owing to the short-circuit current to exceed the reference values Vref1 and Vref2, both of the FET's Q1 and Q2 are turned off and the delivery of current is stopped. Thereafter, the voltages of the capacitors C1 and C2 are decreased by means of the discharge means 13 and 14 and when any one of the voltages falls below VLH, the switching devices are again turned on to resume the supply of current. In this manner, the lighting circuit has by itself the function of interrupting the short-circuit current and performing the subsequent restart, thus attaining high reliability.

Figure 17:
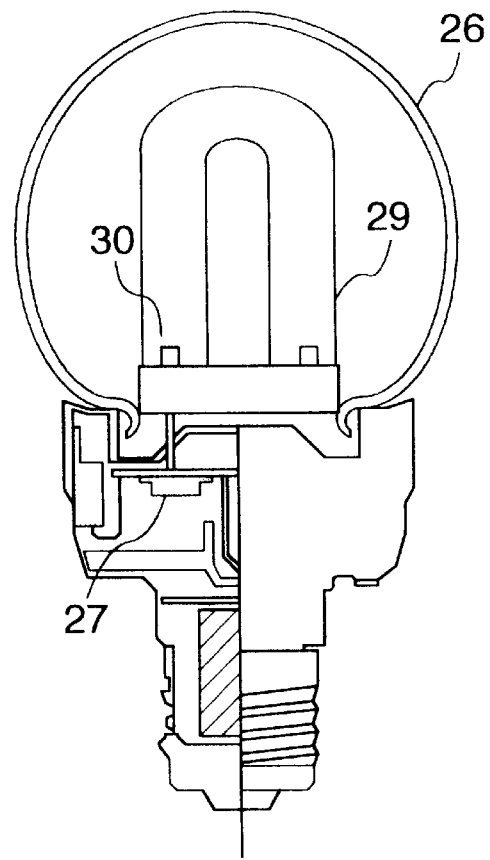
FIG. 17 is a perspective view, partly exploded, of an embodiment of an electric lamp type fluorescent lamp incorporating a lighting circuit.

The lighting circuit of the present invention has the same effect on an ordinary fluorescent lamp with filament as shown in FIG. 17. The bulb lamp type fluorescent lamp with filament is constructed as shown in FIG. 17. A fluorescent lamp 29 is provided in a discharge tube 26 and a filament 30 is mounted in the lamp. A lighting circuit 27 is mounted above a lamp base.

Figure 18:
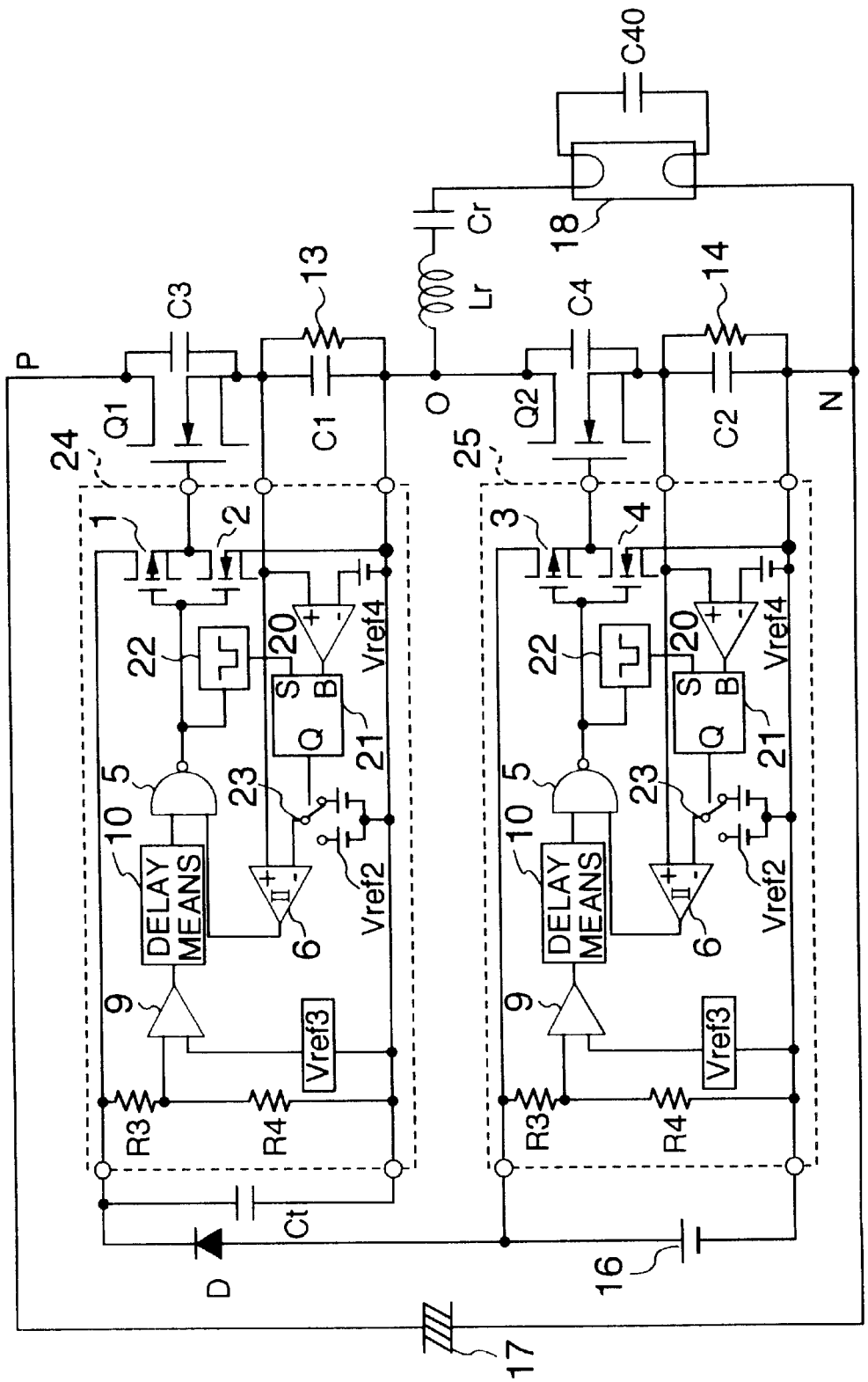
FIG. 18 is a circuit diagram of an embodiment of a lighting circuit for electric lamp type fluorescent lamp.

The lighting circuit of the present invention applied to the fluorescent lamp with filament is specifically constructed as shown in FIG. 18. In FIG. 18, with the aim of pre-heating the filament during start, the resonance circuit is differently constructed from that of FIG. 15 and control means 24 and 25 for FET's Q1 and Q2 also have the pre-heating function to partly differ in construction from the control means 11 and 12 in FIG. 15.

More specifically, FIG. 18 structurally differs from FIG. 15 in that in the resonance circuit, a resonance reactor Lr and a resonance capacitor Cr and a fluorescent lamp 18 are connected in series between an output O and a common point N, and an auxiliary capacitor C40 is connected across the lamp 18. A capacitor C3 is connected in parallel with the FET Q1 between the drain and source thereof and a capacitor C4 is connected in parallel with the FET Q2 between the drain and source thereof so as to assist in soft switching operation as will be described later.

The control means 24 and 25 have the same construction and only the control means 24 will be described. A comparator means for detecting voltage of the capacitor C1 includes, in addition to the same comparator 6 as that in the foregoing embodiment, a newly added comparator 20. The comparator 20 is associated with a reference voltage Vref4 and as the voltage of the capacitor C1 falls below Vref4, the comparator 20 changes its output to deliver a reset signal (R) to a flip-flop 21. A one shot pulse generating means 22 is provided for supplying a set signal (S) to the flip-flop 21. The one shot pulse generating means 22 delivers a low pulse in synchronism with a timing for turning on a device 2 to set the flip-flop 21. An output (Q) of the flip-flop 21 transfers a switch 23 in accordance with its state to change a reference voltage Vref2 associated with the comparator 6. The remaining components are identical to those of the control means 11 shown in FIG. 15.

In FIG. 18, the lamp 18 serving as a load on the resonance circuit is connected in series with the reactor Lr and capacitor Cr and is connected in parallel with the capacitor C40 and this resonance circuit is called a series-parallel resonance circuit which is generally employed in the fluorescent lamp lighting circuit. In the series-parallel resonance, the driving frequency is related to the current in the lighting circuit as shown in FIG. 19.

Figure 19:
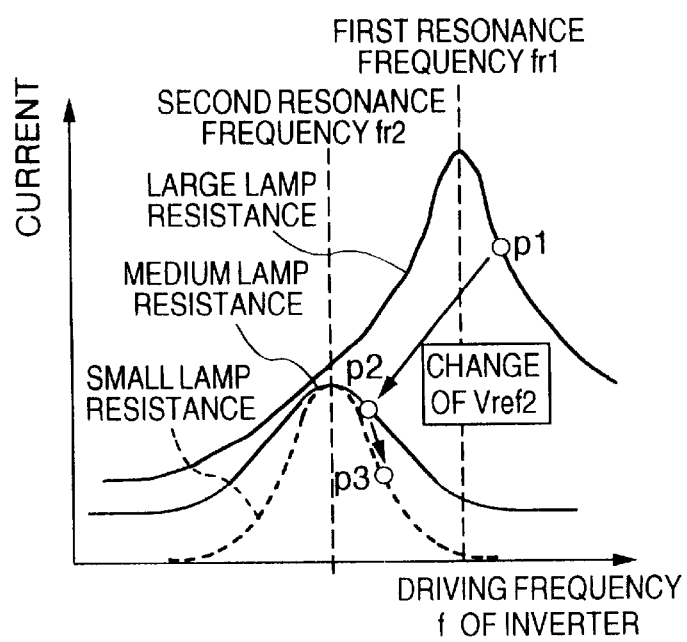
FIG. 19 is a graph for explaining the operation during series-parallel resonance.
Figure 20:
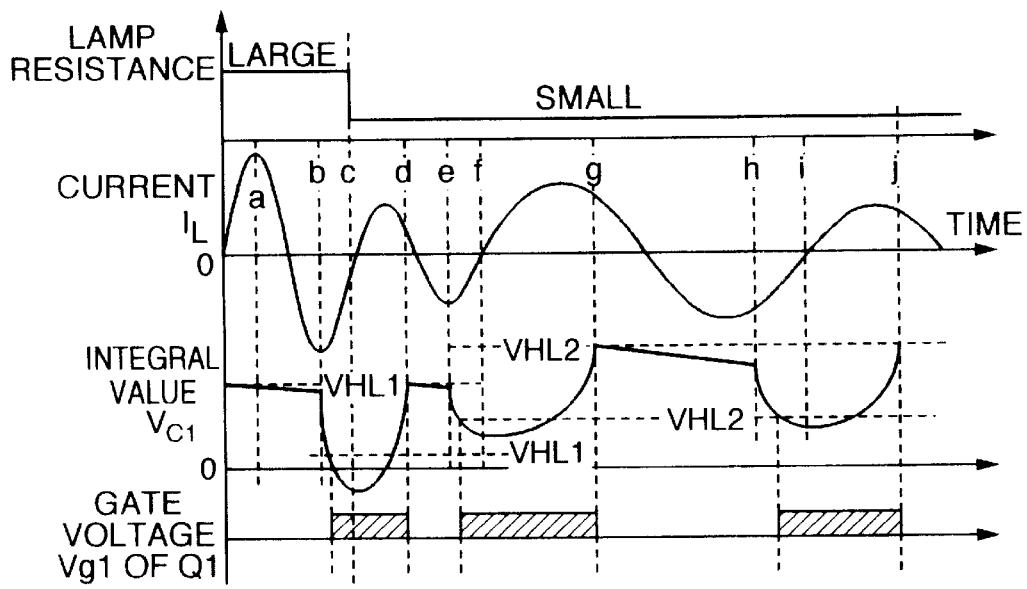
FIG. 20 is a time chart for explaining the start operation during series-parallel resonance.

Like FIG. 16, FIG. 19 shows three values, small, medium and large, of lamp resistance, of which a large resistance corresponds to a filament pre-heated state during start. Since the lamp resistance is very high during start, the capacitor C40 is equivalently connected in series with the reactor Lr and capacitor Cr. At that time, the resonance frequency is determined by values of Lr, Cr and C40 and this is defined as a first resonance frequency fr1. On the other hand, when the lamp is lit and the lamp resistance becomes sufficiently smaller than an impedance of the capacitor C4, the resonance frequency is determined by only Lr and Cr and this is defined as a second resonance frequency fr2. In the case of the fluorescent lamp with filament, a method is generally employed in which the lighting circuit is operated near the first resonance frequency during start for the purpose of pre-heating the filament and when the lamp is subsequently lit, the lighting frequency is changed to take a value near the second resonance frequency. In the present embodiment, the change of frequency from fr1 to fr2 is effected by changing the reference voltage Vref2 of the comparator 6. This operation is shown in FIG. 20. During start, the lamp resistance is large and hence the current value is also large as shown in FIG. 19. When the device 2 is turned on to turn off the FET Q1 under this condition, a set signal is delivered out of the one shot pulse generating means of FIG. 18 to set the flip-flop 21, with the result that a combination of reference voltages VHL1 and VLH1 of the comparator 6 is switched to a combination of VHL2 and VLH2. Since VHL2 is higher than VHL1, the FET Q1 is not again turned on immediately after switching. Thereafter, current IL flows through an anti-parallel (backward parallel) diode of the FET Q1 during a time interval of mode 4 to counter-charge the capacitor C1 and because of a large value of the current, voltage of the capacitor C1 decreases to a negative value. At that time, the voltage of the capacitor C1 falls below Vref4 and so the comparator 20 transmits a reset signal to the flip-flop 21. As a result, the reference voltage of the comparator 6 switches from the previous combination of VHL2 and VLH2 to the combination of VHL1 and VLH1. By repeating this operation, only VHL1 of the reference voltage of the comparator 6 for turn-off of the FET Q1 acts during start operation in which the current is large.

Subsequently, as the lamp is lit and the lamp resistance decreases, the current is also decreased. This time point is indicated by c in FIG. 20. After time point c, even when the capacitor C1 is counter-charged by a decreased current IL during the aforementioned mode 4, the decrease of voltage of the capacitor C1 is small, so that on the assumption that the voltage of the capacitor C1 does not fall below Vref4, the comparator 20 does not set the flip-flop 21 and the reference voltage of the comparator 6 is limited to only the combination of VHL2 and VLH2. In FIG. 20., this state is indicated by time points following time point g.

Through the above operation, by setting the reference voltage of comparator 6 being of the combination of VHL1 and VLH1 for the start operation near the first resonance frequency and setting the reference voltage of comparator 6 being of the combination of VHL2 and VLH2 for the stationary lighting operation near the second resonance frequency, stable operation of the lighting circuit can be warranted near the two different resonance frequencies.

In the case of the lamp with filament, a state will occur in which emission from one filament or both filaments is stopped at the end of life. In this state, the lamp resistance again becomes high and through the operation of FIG. 20, the driving frequency of the lighting circuit returns to the proximity of the first resonance frequency. However, in contrast to the operation during start, the lamp resistance in this phase does not decrease even under the application of a large current. Therefore, in this case, when a condition that the voltages of the capacitors C1 and C2 continue to be below Vref4 for a predetermined time or more can be determined, the operation of the lighting circuit can be stopped. If the lamp 18 is removed while the lighting circuit is operating, the driving frequency can also be returned to the proximity of the first resonance frequency corresponding to large lamp resistance. This case can also be determined as a condition that the voltages of the capacitors C1 and C2 continue to be below Vref4 for a predetermined time or more and the operation of the circuit can be stopped.

In this manner, the comparator 20 can also be used to have the protective function for avoidance of overcurrent at the end of lamp life or during opening of lamp.

Figure 21:
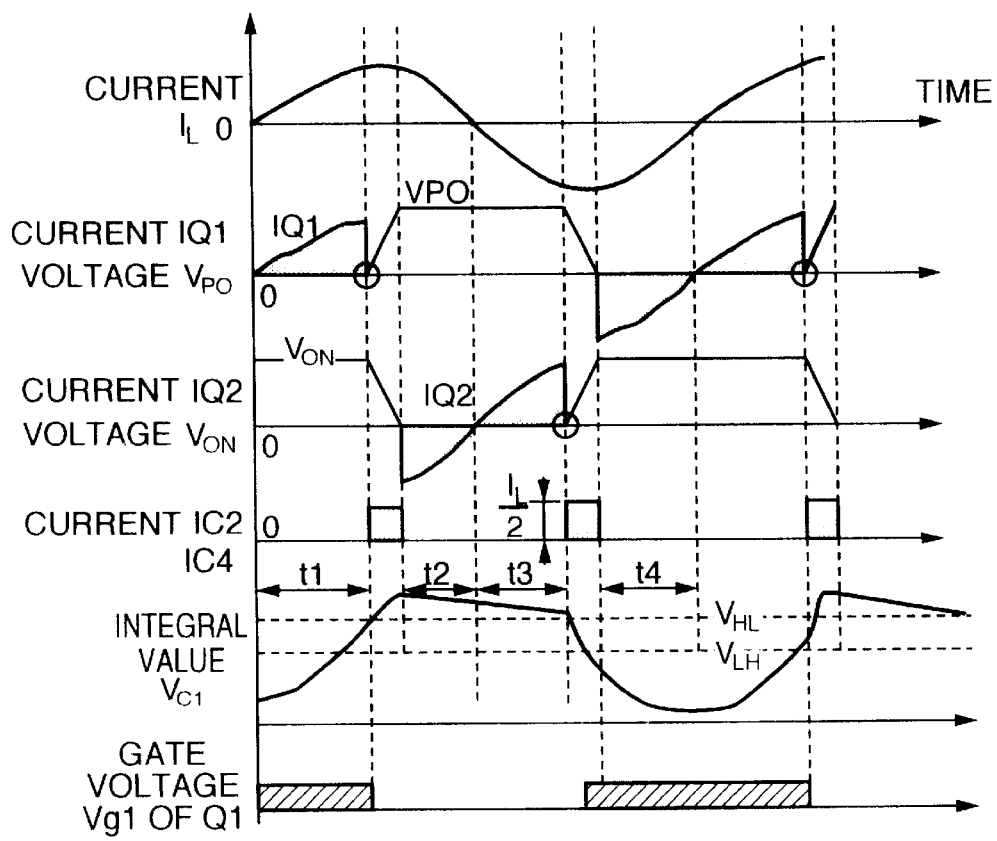
FIG. 21 is a time chart for explaining the soft switching operation.

FIG. 21 is a time chart for explaining soft switching operation by the capacitors C3 and C4 connected in parallel with the FET's Q1 and Q2. In the Figure, between the end of time interval t1 and the beginning of time interval t2, voltage of the capacitor C1 exceeds the reference voltage VHL to turn off the FET Q1 but current IL/2 flows through the capacitor C3 to limit voltage rise dV/dt of the FET Q1 by (IL/2)C3. At the same time, current IL/2 for discharging the capacitor C4 flows and dV/dt at the time of voltage drop of the FET Q2 is similarly limited by (IL/2)C4. The dV/dt during switching leads to conduction noise and discharge noise but by performing soft switching which suppresses the dV/dt as in the present embodiment, such a problem can be mitigated. Current waveform of the FET Q1 is described with a circle at the termination of t1 time interval to indicate that the voltage of the FET Q1 is almost zero at this time point and current does not overlap voltage in the FET Q1 so as to avoid switching loss. In this manner, the soft switching is effective from the viewpoint of reducing the switching loss.

Through the above operation, charging current of the capacitor C3 also charges the capacitor C1 and similarly, charging current of the capacitor C4 counter-charges the capacitor C2. But this is equivalent to such a phenomenon that operation in mode 1 and operation in mode 2 proceed simultaneously, and does not adversely affect the lighting operation in the present invention.

The above operation occurs between the end of time interval t3 and the beginning of time interval t4 on the basis of the same principle but will not be described.

Figure 22A:
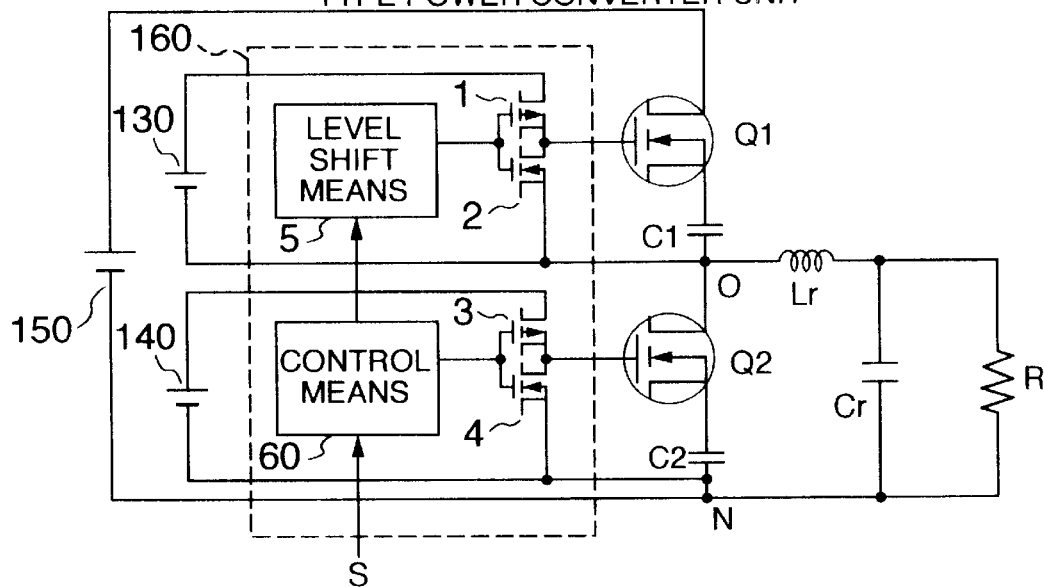
FIGS. 22A, 22B illustrate the construction and operation of another embodiment of the resonance type power converter unit according to the present invention.
Figure 22B:
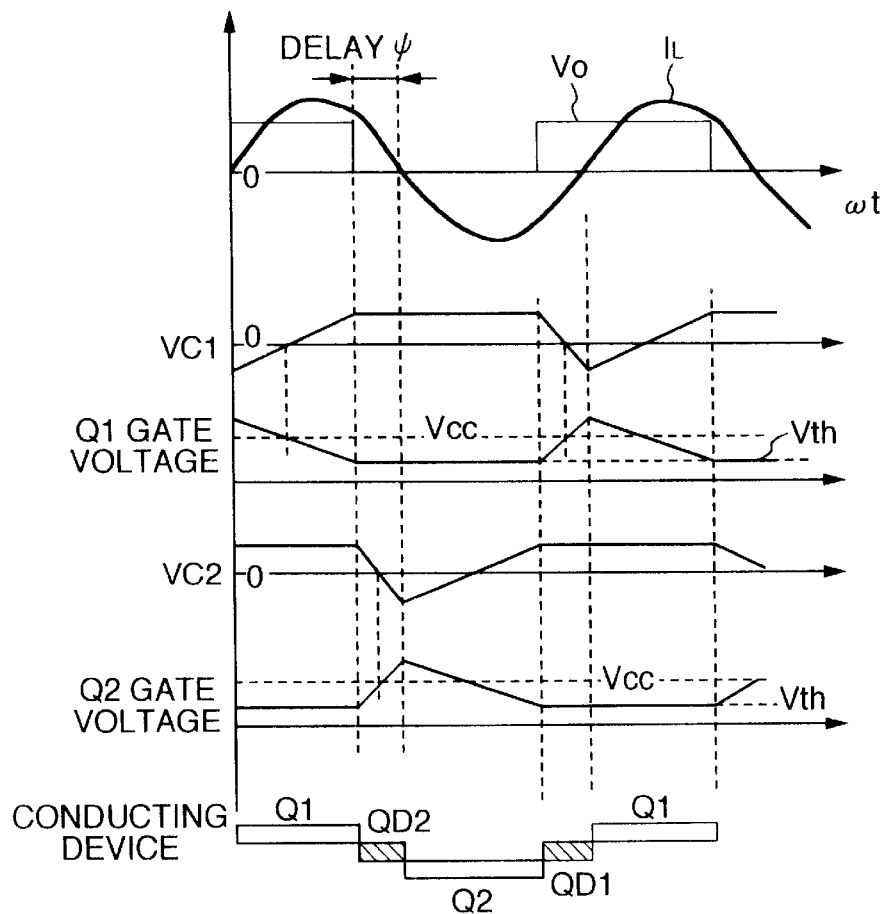

Referring now to FIG. 22, there is illustrated another embodiment of the present invention. FIG. 22 illustrates at section (a) the construction of a resonance type power converter unit according to the present embodiment and at section (b) the operation of the power converter unit. The present embodiment differs from the foregoing embodiments in that the comparators for comparing the voltages of the capacitors C1 and C2 with the reference values Vref1 and Vref2 are eliminated. A control means 60 has the function of responding to a signal S to transmit a random control command to MOSFET's Q1 and Q2 through a level shift means. The remaining components are identical to those in the FIG. 1 embodiment.

Miniaturization of the voltage driven type device such as a MOSFET has been promoted year after year and because of a decrease in on-resistance of the device, sufficient current is allowed to flow without causing the device to be saturated when the gate/source voltage has a value which slightly exceeds the threshold voltage. In the embodiment shown at (a) in FIG. 22, when drive voltage sources 130 and 140 has a voltage value of Vcc, a gate voltage (control voltage) of (Vcc-Vc1) is applied between the source and gate of MOSFET Q1. The voltage Vc1 increases with a current flowing through the MOSFET Q1 as described previously and the MOSFET Q1 is turned on or off depending upon whether or not (Vcc-Vc1) is larger than a gate threshold voltage Vth of the MOSFET Q1. The embodiment shown at (a) in FIG. 22 features in that inverter operation in synchronism with the resonance frequency can be allowed to continue without resort to any special comparator by utilizing the phenomenon that (Vcc-Vc1) is increased or decreased in accordance with the resonance current IL. This holds true in the case of turn-on/off of MOSFET Q2.

The operation will be described by making reference to section (b) in FIG. 22. Voltages Vc1 and Vc2 change positively and negatively in accordance with resonance current IL and are applied between the gate and source of the MOSFET Q1 and between the gate and source of the MOSFET Q2 in opposite polarities. As a result, as the voltage (Vcc-Vc1) falls below the threshold voltage Vth of the MOSFET Q1, the MOSFET Q1 is turned off and current flows through diode QD2. As in the case of the FIG. 1 embodiment, voltage Vc2 is decreased by the current flowing through the diode QD2 and as the (Vcc-Vc2) exceeds the threshold voltage Vth of the MOSFET Q2, the MOSFET Q2 is allowed to be turned on. During one cycle, the above operation repeats itself.

More particularly, on the assumption that the direction of a current flowing into reactor Lr and capacitor Cr of a resonance circuit when voltage driven type semiconductor device Q1 of the high-potential side of the inverter is turned on is positive, the capacitor C1 is charged by the positive direction current flowing through the device Q1 and the gate (control) voltage (Vcc-Vc1) is applied between the gate and source of the MOSFET Q1. As a result, with initial flow of the current, the gate voltage of the MOSFET Q1 is decreased to increase the on-resistance of Q1 and additional flow of the current acts on the MOSFET Q1 to turn it off. Subsequently, as the MOSFET Q1 is turned off, the resonance current IL flows through the circulating diode QD2 of the low-potential side voltage driven type semiconductor device Q2. This current is a backward current for the MOSFET Q2 and a voltage charged on the capacitor C2 during one preceding cycle is discharged by this backward current and the capacitor C2 is then charged with a voltage of inverting polarity. This voltage acts to superimpose a positive voltage on the gate (control) voltage of the MOSFET Q2 and as the positive voltage exceeds a gate threshold value of the MOSFET Q2, the MOSFET Q2 is rendered to be turned on. However, so long as current flows through the circulating diode QD2, no forward current flows through the MOSFET Q2. Subsequently, when the polarity of the resonance current changes, a current flows through the MOSFET Q2 and the capacitor C2 is charged with this current to superimpose a negative voltage on the gate (control) voltage of the MOSFET Q2, thereby decreasing the gate (control) voltage of the MOSFET Q2. With additional flow of current, the gate (control) voltage of the MOSFET Q2 falls below the gate threshold value of the MOSFET Q2 and the MOSFET Q2 is turned off. As a result, the resonance current IL flows through a circulating diode QD1 of the MOSFET Q1. The voltage charged on the capacitor C1 by the backward current during the previous cycle is decreased. Thereafter, the polarity of the charge voltage is inverted to superimpose a positive voltage on the gate (control) voltage of the MOSFET Q1 and as the positive voltage exceeds the gate threshold of the MOSFET Q1, the MOSFET Q1 is rendered to be turned on.

During one cycle operation as above, the voltage driven type semiconductor devices Q1 and Q2 of the inverter are turned on and off by the capacitors C1 and C2 in synchronism with the resonance current IL. The devices Q1 and Q2 are turned on by causing currents to flow through the circulating diodes QD1 and QD2 associated with the devices Q1 and Q2 and conversely, the devices Q1 and Q2 are turned off by causing currents to flow through these devices Q1 and Q2. This warrants that current does not flow through the high-potential side circulating diode QD1 immediately before turn-on of the low-potential side device Q2, and the operation does not proceed in leading phase but proceeds in lagging phase without fail.

According to the present embodiment, the MOSFET's Q1 and Q2 are switched without routing the comparator and NAND circuit to reduce the time delay, and the present embodiment is suitable for a high-frequency resonance-type inverter of several of MHz or more.

As described above, in the present embodiment, the capacitors C1 and C2 are provided, charge voltages on the capacitors C1 and C2 are decreased by currents flowing through the circulating diodes associated with the devices Q1 and Q2 and when the gate/source voltages (gate (control) voltages) of Q1 and Q2 which are based on the charge voltages fall below the gate threshold voltages, the devices Q1 and Q2 are turned on. Conversely, when currents flow through the devices to increase charge voltages on the capacitors C1 and C2 and the gate voltages of Q1 and Q2 which are based on the charge voltages exceed the gate threshold voltages, the devices Q1 and Q2 are turned off. As a result, in the present embodiment, too, the voltage driven type semiconductor devices Q1 and Q2 of the inverter are turned on or off in synchronism with the resonance current IL as in the FIG. 1 embodiment and the operation proceeds in lagging phase $\phi$ without fail. Accordingly, any backward recovery current of diode does not flow and the switching loss can be decreased.

Referring now to FIG. 23, there is illustrated an embodiment in which the present invention is applied to a lighting apparatus of an electrodeless lamp. In FIG. 23, an electrodeless lamp R has a coil wound in proximity of a discharge bulb filled with mercury or amalgam and inert gas. A high-frequency current is passed through the coil to generate a high-frequency magnetic field in the bulb, thereby lighting the lamp. This type of lamp features in that the filament provided for the ordinary fluorescent lamp is removed. Like the construction shown in FIG. 1, an inverter for driving the electrodeless lamp has MOSFET's Q1 and Q2 having sources connected with capacitors C1 and C2 which are connected in parallel with discharge means 13, respectively. Further, as in the embodiment of FIG. 9, comparators 90 and 100 are hysteresis comparators. While in the FIG. 9 embodiment the voltage of the capacitor Ct is divided by the resistors R3 and R4 and a divisional voltage is detected by the comparator 9 to apply a start signal to the NAND circuit 5, a level shift means is used and a start signal is applied to an upper arm in the present embodiment. The level shift means can also be used for an application of applying a lighting control signal as shown in FIGS. 12 and 13.

Reactor Lr and capacitor Cr for resonance are connected in series between an output O and a common point N of the inverter and the electrodeless lamp R and an auxiliary capacitor C40 are connected in series across the capacitor Cr. In the inverter, AC current fed from an AC power source 170 is passed through a rectifier circuit comprised of a low-pass filter 180 and diodes D1 to D4 so as to be rectified, a smoothing capacitor CE is charged with the rectified current and a smoothed current is supplied from the capacitor CE to the inverter.

For lighting the electrodeless lamp R efficiently, it is important to apply an AC voltage of several of MHz or more to the resonance circuit of Lr and Cr from the inverter. With the construction of FIG. 23, since the inverter can be driven in synchronism with the resonance current IL and the operation in lagging phase can be warranted even for a high-frequency AC voltage of several of MHz or more, the switching loss can be reduced and the electrodeless lamp R can be lit efficiently in the present embodiment.

An example of existing electrodeless lamp lighting apparatus having the function of lighting control of lamp is not available but according to the FIG. 23 construction, the lighting control can be ensured by changing the switching frequency of the inverter as in the case of the ordinary fluorescent lamp with filament. More particularly, as the switching frequency f of the inverter becomes higher than the resonance frequency fo more and more, the resonance current can be reduced while being kept in lagging phase. In the case of the electrodeless lamp, however, the frequency at the resonance point is several of MHz and therefore, it is not easy to drive the inverter at a switching frequency which is several times the resonance point frequency. Especially, in the high-frequency inverter, the arm short-circuit in which the MOSFET's Q1 and Q2 are turned on simultaneously is predicted and a preventive measure for the arm short-circuit is a matter of importance.

Here, a protection processing for the case of occurrence of the arm short-circuit will be described which is based on replacement of the control circuit 16 shown in FIG. 23 with the control circuit 160 shown at (a) in FIG. 22 and drive of the inverter effected by means of the control means 60 and level shift means 50 at a frequency several times higher than that in the ordinary lighting.

When the MOSFET's Q1 and Q2 are turned on simultaneously, currents flow from the smoothing capacitor CE to the MOSFET's Q1 and Q2 and these currents reach values determined by a saturation current of the MOSFET Q1 or Q2. On the other hand, the short-circuit current necessarily passes through the capacitors C1 and C2 to charge them with currents larger than those during lighting and the increase of voltages on these capacitors is accelerated. The smaller the gate voltage, the lower the saturation current of the voltage driven type device becomes but the gate voltages of the MOSFET's Q1 and Q2, indicated by (Vcc-Vc1) and (Vcc-Vc2), respectively, as described previously, are decreased as the voltages Vc1 and Vc2 tend to be larger in accordance with the short-circuit current so as to decrease the saturation current (namely, short-circuit current). This phenomenon is of a negative feedback function and the short-circuit current is automatically lowered by the negative feedback function.

As described above, in the resonance type inverter of the present invention, prevention of breakage of the unit due to the arm short-circuit can be warranted and therefore, the present inverter can be said to be suitable from the standpoint of unit protection during arm short-circuit.

Figure 24:
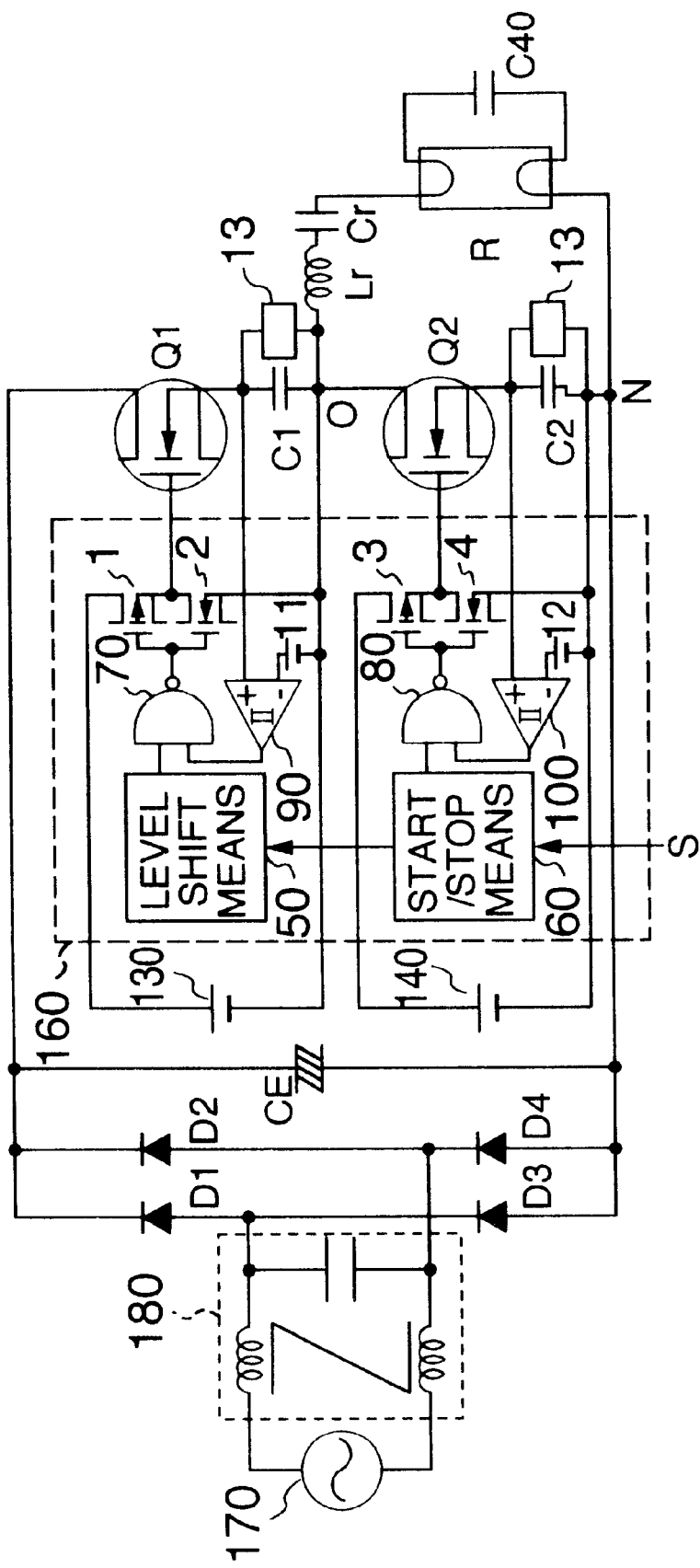
FIG. 24 is a circuit diagram showing the construction of a fluorescent lamp lighting apparatus using the present invention.

Referring to FIG. 24, there is illustrated an embodiment in which the present invention is applied to a lighting apparatus of a fluorescent lamp. In FIG. 24, R designates a fluorescent lamp with filament and in the case of the fluorescent lamp with filament, the construction of a resonance circuit including the lamp connected between an output 0 and a common point N of the inverter slightly differs from the construction of the resonance circuit in FIG. 23, but the remaining components are identical to those of FIG. 23 and the lighting apparatus of FIG. 24 attains the same effect as that by the electrodeless lamp lighting apparatus for high frequency of FIG. 23. A control means 16 for driving MOSFET's Q1 and Q2 may have the same construction as the control means shown at (a) in FIG. 22.

In the case of the fluorescent lamp with filament, a state will occur in which emission from one filament or both filaments is stopped at the end of life. For example, when emission from the two filaments is stopped in FIG. 24, a lamp R is rendered to have a high resistance to establish a configuration in which reactor Lr, capacitor Cr and auxiliary capacitor C40 are connected in series between the output O and the common N. A resultant capacitance of the capacitors Cr and C40 makes the resonance frequency fo high and therefore, in the conventional lighting apparatus, the leading phase state represented by f<fo takes place.

According to the present embodiment, the generation of a loss due to the leading phase or the occurrence of overcurrent due to the change of resonance point can be suppressed even at the end of lamp life. More particularly, when the resultant capacitance of the capacitors Cr and C40 makes the resonance frequency fo high and the resonance current is increased, the time required for the capacitor C1 or C2 to be charged with a current flowing through the MOSFET Q1 or Q2 is also decreased, thus ensuring that voltages of the capacitors C1 and C2 can be detected within a time interval during which currents flow through these devices to maintain the operation for turning off the MOSFET Q1 or Q2. In other words, this means that the lagging phase state can be maintained by following the change of resonance frequency.

Incidentally, if the leading phase is assumed to be reached, a backward recovery current flowing through one circulating diode passes through the capacitors C1 and C2 and consequently, both the voltages Vc1 and Vc2 are increased. In the case of the FIG. 1 embodiment, the voltages Vc1 and Vc2 tend to exceed the reference value VHL in proportion to the magnitude of the backward recovery current and so the comparators 9 and 10 operate to turn off the MOSFET's Q1 and Q2. In the case of the FIG. 22 embodiment, (Vcc-VC1) and (Vcc-VC2) fall below the gate threshold voltages, thus turning off the Q1 and Q2. In this manner, in the present embodiment, the inverter stops operating asynchronously with the resonance cycle. This operational stoppage, however, effectively acts to provide the protective function of avoiding abnormality at the end of lamp life.

Figure 25A:
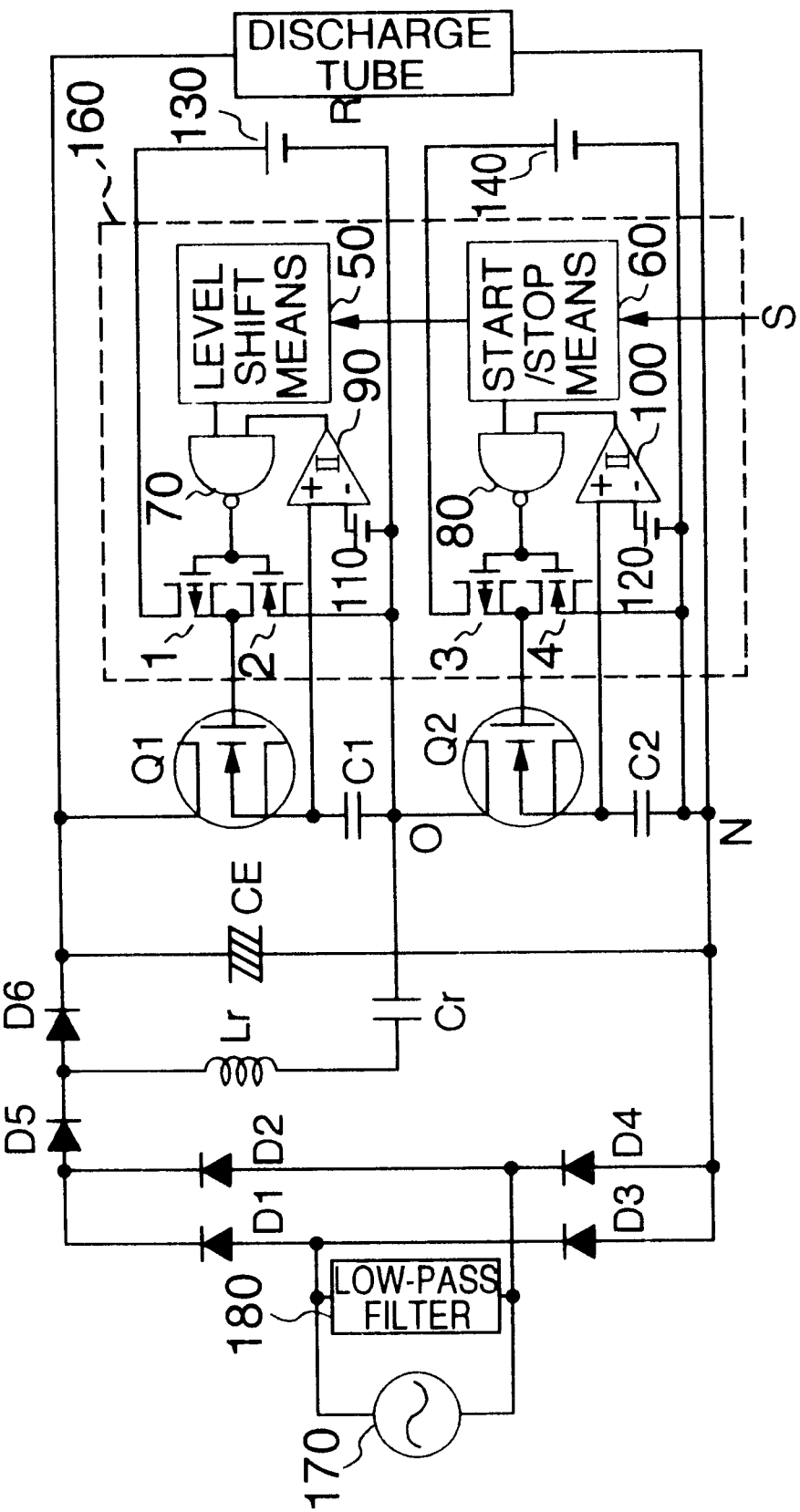
FIGS. 25A, 25B, 25C illustrate the construction and operational modes of a higher harmonics suppressing high-efficient converter using the present invention.
Figure 25B:
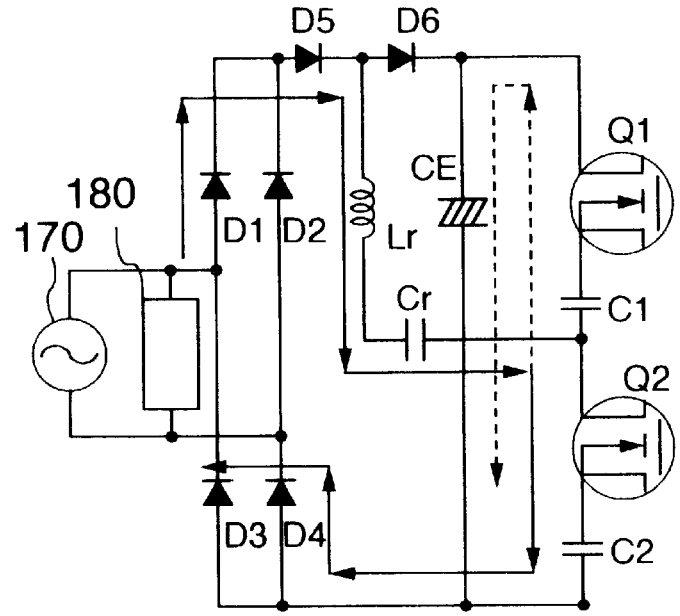
Figure 25C:
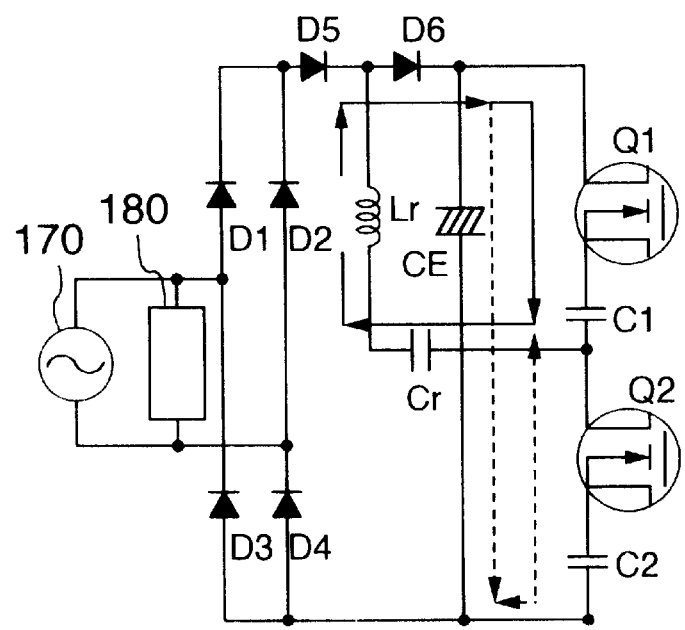

Referring to FIG. 25, there is illustrated an embodiment in which the present invention is applied to a high-efficiency converter for suppression of higher harmonics. The converter is constructed as shown at (a) in FIG. 25.

In recent years, regulations on power source higher harmonics have been put into effect and many higher harmonics suppressing high-efficiency converters have been reported. One of them is a so-called current interrupted type converter in which an AC current fed from an AC power source 170 is passed through a rectifier circuit using a low-pass filter 180 and diodes D1 to D4 so as to be rectified and then passed through a choke coil Lr. In an ordinary current interrupted type converter, a current flowing through the choke coil Lr is chopped to a high frequency by means of a power semiconductor switch device and energy stored in the coil Lr is supplied to a power source capacitor CE. The current flowing through the coil Lr changes in amplitude in accordance with the AC voltage and so a waveform obtained by passing this high-frequency current through the low-pass filter 180 approximates a sine wave.

In the present embodiment, diode D5, choke coil Lr and resonance capacitor Cr are connected in series between the high-potential side of the rectifier circuit and an output 0 of the inverter and a diode D6 having its anode connected to a connecting node of the diode D5 and coil Lr and its cathode connected to the high-potential side of the power source capacitor CE, thereby providing a resonance type high-efficient converter. The construction of the inverter and a control means 160 for driving MOSFET's Q1 and Q2 are identical to those in FIG. 1 and will not be described. A load R is connected across the capacitor CE. The construction of the control means 16 for driving the MOSFET's Q1 and Q2 may be identical to that shown at (a) in FIG. 22.

The operational modes in the present embodiment are shown at (b) and (c) in FIG. 25. At (b) in FIG. 25, when the MOSFET Q2 is turned on, current from the rectifier circuit flows through a path routing D5, Lr, Cr, Q2 and C2 and returning to the AC side. This current is a resonance current whose resonance frequency is determined by the coil Lr and capacitor Cr, having its waveform being sinusoidal and its amplitude being proportional to the amplitude of the AC power source 170. Voltage Vc2 of the capacitor C2 is increased by this current and as its value exceeds VHL, the MOSFET Q2 is turned off. The current flowing through the coil Lr passes through a circulating diode QD1 of MOSFET Q1 and capacitor CE to return to the AC side, while charging the capacitor CE as shown by dotted line at (b). Voltage Vc1 of the capacitor C1 charged during the preceding cycle is decreased by this current and as its value falls below VLH, the MOSFET Q1 is allowed to be turned on. Subsequently, at (c) in FIG. 25, the polarity of the resonance current changes to discharge voltage charged on the capacitor Cr through the path as shown at (b) in FIG. 25, with the result that a current flows through a path of Cr, Lr, D6, Q1 and C1 to increase the voltage of the capacitor C1, and as the value of the voltage exceeds VHL, the MOSFET Q1 is turned off. Then, as shown by dotted line at (c), the current flows a different path of Cr, Lr, D6, CE, C2 and QD2 to decrease voltage Vc2 of the capacitor C2, thereby allowing the MOSFET Q2 to be turned on.

This operation is identical to the operation of the FIG. 1 embodiment with the exception that the amplitude of the resonance current is proportional to the amplitude of the AC power source 170. This affects the on-duration of each of the MOSFET's Q1 and Q2. More particularly, when the amplitude of the AC power source 170 is low, the current is also small and the time for each of the voltages Vc1 and Vc2 to reach VHL is prolonged to increase the on-duration of each of the devices Q1 and Q2. Conversely, when the amplitude of the AC power source 170 is high, the current is also large and the time for each of the voltages Vc1 and Vc2 to reach VHL is shortened to decrease the on-duration of each of the devices Q1 and Q2. In this case, the devices Q1 and Q2 are operated automatically in pulse width modulated fashion conforming to the sine wave of the AC power source 170 and a current fed from the AC power source 170 more approaches a sine wave than a current chopped by the ordinary current interrupted type converter to thereby reduce higher harmonics.

As described above, in the present embodiment, higher harmonics of the current fed from the AC power source 170 can be suppressed by using the resonance type inverter provided with the capacitors C1 and C2 and besides, backward recovery of the circulating diodes QD1 and QD2 as described in connection with the FIG. 1 embodiment does not occur and hence the switching loss can be reduced to additionally have the protection function during arm short-circuit as described in connection with the FIG. 23 embodiment.

In the present embodiment, the diode D5, choke coil Lr and resonance capacitor Cr are connected in series between the high-potential side of the rectifier circuit and the output 0 of the inverter but alternatively, they may be connected in series between the low-potential side of the rectifier circuit and the output 0 of the inverter.

Figure 26:
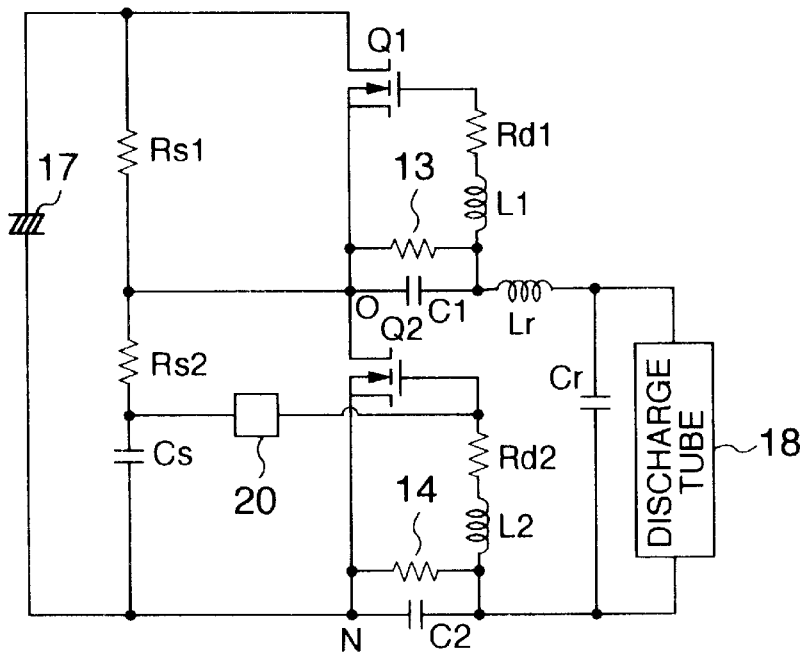
FIG. 26 illustrates still another embodiment disclosing a drive circuit for electrodeless fluorescent lamp utilizing this invention.

Referring to FIG. 26, there is illustrated another embodiment disclosing a drive circuit for electrodeless fluorescent lamp utilizing this invention. in this embodiment, capacitor C1 which is an integrating means is disposed between output means 0 and resonance inductor Lr and capacitor C2 is provided between resonance capacitor Cr and source terminal N of FET Q2, which are the difference compared to preceeding embodiments. As same as in the other embodiments, discharging means 13 and 14 are provided for each C1 and C2. In addition, inductor L1 and resistance Rd1 are provided in series between one end of integrating means C1 and gate of FET Q1, in the same way, inductor L2 and resistance Rd2 is provided in series between one end of integrating means C2 and gate terminal of FET Q2. L1 and Rd1 are phase shifting means, it gives a delay in phase when the voltage charged in C1 is applied to between gate and source of FET Q1. In the same way, L2 and Rd2 are also a phase shifting means for causing a delay in phase when aplying voltage charged in L2 and Rd2 to between gate and source of FET Q2. The characteristic of FIG. 26 is in not including a drive circuit means 11 and 12 as in other embodiments (such as in FIGS. 1, 8 and 15 etc), it is effective to realize an apparatus in a low price.

In FIG. 26, resistances Rs1, Rs2 and capacitor Cs are connected in series between positive pole and negative pole of direct current source 17, and bidirectional thyrister called SIDAC (Silicon Diode for Alternating Current) is provided between connecting point of Rs2, Cs and gate terminal of FET Q2. In the activating circuit comprising from above mentioned elements, SIDAC is in off-state when the direct current source is less than a predetermined value, and the voltage of power source 17 is supplied to resonance capacitor Cr through resistance Rs1. In the following, when the voltage of the current source 17 becomes more than the predetermined value, SIDAC turns on, integrating means C2 is charged through resistance Rs1, Rs2 and SIDAC 20. The voltage in C2 is applied to gate of FET Q2 through phase shifting L2 and Rd2, an operation in which Q1 and Q2 are turned on and off alternatively is initiated by Q2 is turned on.

Figure 27:
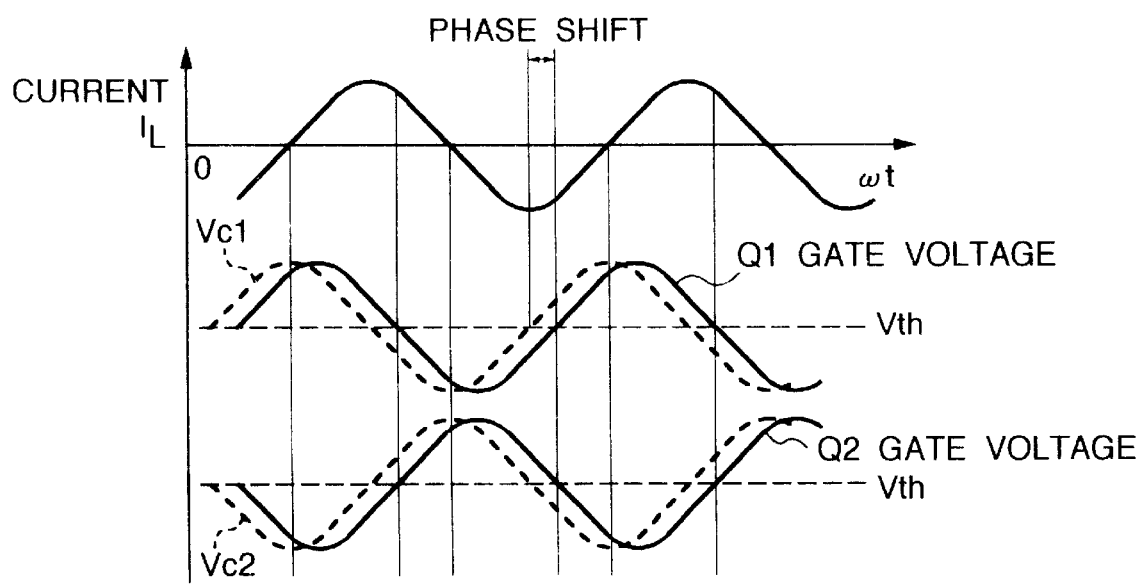
FIG. 27 is an operational waveform of circuit depicted in FIG. 26.

In FIG. 27, there is exemplified an operational waveform of circuit depicted in FIG. 26. Resonance current IL is flow through integrating means C1 and C2, and the voltage applied to C1 and C2 are same value, and becomes sine waves of which polarities are opposite with each other. An voltage waveform indicated by dotted line which are phase shifted sign wave voltage of C1 and C2 are provided to gate of Q1 and Q2 respectively. A current will flow through Q1 when gate voltage of Q1 is more than a threshold voltage (Vth) and IL is a positive value, and the current will flow through Q2 when gate voltage of Q2 is more than the threshold voltage (Vth) and the value Il is a negative value. In other conditions, the current will flow through diode QD1 and QD2 included in Q1 and Q2 respectively.

As described above, according to the present invention, in the high-frequency resonance type power converter unit, the leading phase can be prevented and the operation in lagging phase can be ensured, so that any backward recovery current of diode does not flow to decrease the switching loss and to warrant stable operation of the inverter synchronous with the resonance current.

Further, in the lighting apparatus of the electrodeless lamp operative at several of MHz or more, the lighting control function can newly be added, the switching loss can be reduced, the electrodeless lamp R can be lit with high efficiency and the short-circuit current in the event of arm short-circuit can automatically be lowered to ensure the apparatus protection.

Further, in the ordinary fluorescent lamp lighting apparatus, the lagging phase state can be maintained by following the resonance frequency even when the resonance frequency changes at the end of lamp life and the protective function of avoiding abnormality at the end of lamp life assists in stoppage of operation of the resonance type power converter unit to realize the protection thereof.

Further, in the higher harmonics suppressing high-efficient converter, higher harmonics of a current fed from the AC power source can be suppressed, the switching loss can be reduced and the protection in the event of arm short-circuit can be ensured.

We claim:

1. A resonance type power converter unit for supplying an AC voltage to resonance means in accordance with switching of power semiconductor devices each having the function not to prevent a backward current, comprising:
   integrating means for integrating forward and backward currents flowing through said power semiconductor devices to provide integral values;
   discharge means for decreasing the integral values in accordance with off-duration of said power semiconductor devices to provide decreased integral values; and
   drive means for turning on and off said power semiconductor devices in accordance with the integral values.

2. A resonance type power converter unit for supplying an AC voltage to resonance means in accordance with switching of power semiconductor devices each having the function not to prevent a backward current, comprising:
   integrating means for integrating part of an AC current flowing through said resonance means to provide integral values;
   discharge means for decreasing the integral values in accordance with off-duration of said power semiconductor devices to provide decreased integral values; and
   drive means for turning on and off said power semiconductor devices in accordance with the thus decreased integral values.

3. A method of controlling the resonance type power converter unit as recited in claim 1 or 2, wherein the following operation is repeated:
   positive currents flowing through said power semiconductor devices are integrated by said integrating means to add the positive currents to provide total values;
   said power semiconductor devices are turned off by said drive means when said total values exceed reference values to cause said discharge means to decrease said total values during the off-duration;
   backward currents flowing through said power semiconductor devices are integrated by said integrating means and the thus integrated values are subtracted from said total values; and
   said power semiconductor devices are turned on by said drive means during a time interval in which said total values fall below said reference values.

4. A method of controlling the resonance type power converter unit as recited in claim 3, wherein said discharge means change a decrease in said integral values per unit time to control the frequency of the AC voltage.

5. A resonance type power converter unit for supplying an AC current to resonance means from an inverter circuit in which voltage driven type semiconductor devices each having the function not to prevent a backward current are connected in series, wherein said voltage driven type semiconductor devices are associated with:
   integrating means for integrating forward and backward currents flowing through said voltage driven type semiconductor devices to provide integral values;
   discharge means for decreasing the integral values in proportion to off-duration of said voltage driven type semiconductor devices to provide decreased integral values; and
   drive means for turning on and off said voltage driven type semiconductor devices in accordance with the integral values.

6. A resonance type power converter unit according to claim 5, wherein said integrating means is a capacitor connected to a first terminal of said voltage driven type semiconductor device, and said drive means is connected to apply a predetermined voltage between the other terminal of said capacitor and a control terminal of said voltage driven type semiconductor device.

7. A resonance type power converter unit according to claim 5, wherein said drive means turns on and off said voltage driven type semiconductor device in accordance with a result of comparison of said integral value with a reference value, and changes at least one of the amplitude and frequency of the AC voltage by changing said reference value.

8. A resonance type power converter unit for supplying an AC current to resonance means from an inverter circuit in which voltage driven type semiconductor devices each having the function not to prevent a backward current are connected in series with a main power source, comprising:
   a low-side semiconductor device of said inverter which is associated with various means including a first capacitor for integrating forward and backward currents flowing through said device, a control power source, first voltage detecting means for detecting a voltage of said first capacitor, first discharge means for decreasing the voltage of said first capacitor in proportion to an off-duration of said low-side semiconductor device, and first drive circuit means responsive to an output of said first voltage detecting means to apply a voltage of said control power source to a control terminal of said low-side voltage driven device;
   a high-side semiconductor device of said inverter which is associated with various means including a second capacitor for integrating forward and backward currents flowing through said device, a second voltage detecting means for detecting a voltage of said second capacitor, second discharge means for decreasing the voltage of said second capacitor in proportion to an off-duration of said high-side semiconductor device, a power source capacitor, third voltage detecting means for detecting a voltage of said power source capacitor, delay means for applying a predetermined delay time to an output of said third voltage detecting means, and second drive circuit means responsive to an output of said second voltage detecting means and an output of said delay means to apply a voltage of said power source capacitor to a control terminal of said high-side voltage driven device; and
   at least a diode connected between a positive polarity of said control power source and a positive polarity of said power source capacitor.

9. A resonance type power converter unit having an inverter comprised of a plurality of voltage driven type semiconductor devices each having the function not to prevent a backward current and resonance means having a reactor and a capacitor which are connected to the output side of said inverter, and being operative to supply an AC current to said resonance means, comprising:

charge voltage means being charged in accordance with currents flowing through said respective voltage driven type semiconductor devices; and drive means for applying control voltages at desired timings to respective control terminals of said voltage driven type semiconductor devices, said charge voltages being superimposed on said control voltages to provide superimposed charge voltages and said voltage driven type semiconductor devices being turned on and off on the basis of the magnitude of the thus superimposed charge voltages.

10. A resonance type power converter unit comprising:

a converter for rectifying an AC voltage;

an inverter including voltage driven type semiconductor devices each having the function not to prevent a backward current;

resonance means connected between an output of said inverter and one of high-voltage and low-voltage side terminals of said inverter and including at least a reactor and a capacitor;

a smoothing capacitor for smoothing a current of said resonance means;

drive means for applying control voltages at desired timings to respective control terminals of said voltage driven type semiconductor devices;

charge voltage means being charged in accordance with currents flowing through said respective voltage driven semiconductor devices; and comparator means for comparing the charge voltages with reference voltages, said control voltages being applied to said voltage driven type semiconductor devices on the basis of outputs of said comparator means to turn on and off said devices.

11. A resonance type power converter unit comprising:

a converter for rectifying an AC voltage;

an inverter including voltage driven type semiconductor devices each having the function not to prevent a backward current;

resonance means including at least a reactor and a capacitor connected between an output of said inverter and one of high-voltage and low-voltage side terminals of said converter;

a smoothing capacitor for smoothing a current to said resonance means;

drive means for applying control voltages at desired timings to respective control terminals of said voltage driven type semiconductor devices; and charge voltage means for superimposing charge voltages complying with currents flowing through said respective voltage driven type semiconductor devices on said control voltages, said voltage driven type semiconductor devices being turned on and off on the basis of said charged voltages.

12. An illumination lighting apparatus for lighting a discharge tube by using a resonance type power converter unit, wherein said resonance type power converter unit is the resonance type power converter unit as recited in claim 1, and said discharge tube is included in said resonance means.

13. An illumination lighting apparatus for lighting a discharge tube by using a resonance type power converter unit, wherein said resonance type power converter unit is the resonance type power converter unit as recited in claim 2, and said discharge tube is included in said resonance means.

14. An illumination lighting apparatus for lighting a discharge tube by using a resonance type power converter unit, wherein said resonance type power converter unit is the resonance type power converter unit as recited in claim 5, and said discharge tube is included in said resonance means.

15. An illumination lighting apparatus for lighting a discharge tube by using a resonance type power converter unit, wherein said resonance type power converter unit is the resonance type power converter unit as recited in claim 8, and said discharge tube is included in said resonance means.

16. An illumination lighting apparatus according to claim 15, wherein during start of lighting, said first capacitor and said power source capacitor are charged, a voltage of said first capacitor is detected by said first voltage detecting means to turn off said low-side voltage driven type semiconductor device, a voltage of said power source capacitor is detected by said third voltage detecting means to turn on said high-side voltage driven type semiconductor and thereafter, said respective voltage driven type semiconductor devices are alternately turned on and off in accordance with charge voltages of said first and second capacitors.

17. An illumination lighting apparatus for lighting a discharge tube by using a resonance type power converter unit, wherein said resonance type power converter unit is the resonance type power converter unit as recited in claim 9, and said discharge tube is included in said resonance means.

18. An illumination lighting apparatus for lighting a discharge tube by using a resonance type power converter unit, wherein said resonance type power converter unit is the resonance type power converter unit as recited in claim 10, and said discharge tube is included in said resonance means.

19. An illumination lighting apparatus for lighting a discharge tube by using a resonance type power converter unit, wherein said resonance type power converter unit is the resonance type power converter unit as recited in claim 11, and said discharge tube is included in said resonance means.

20. A resonance type power converter unit for supplying an AC voltage to resonance means in accordance with switching of power semiconductor devices each having the function not to prevent a backward current, comprising:

integrating means for integrating an AC current flowing through said resonance means to provide integral values;

discharge means connected with said integrating means for decreasing the integral values; and phase shift means connected between said integrating means and control terminals of Q1, Q2, respectively, for providing the integral values as control voltages with phase lagging.

* * * * *